US011606782B2

(12) United States Patent
Azarian Yazdi et al.

(10) Patent No.: US 11,606,782 B2
(45) Date of Patent: Mar. 14, 2023

(54) EVENT TRIGGERED MULTI-LINK CHANNEL QUALITY MEASUREMENT AND REPORT FOR MISSION CRITICAL APPLICATIONS

(71) Applicant: QUALCOMM Incorporated, San Diego, CA (US)

(72) Inventors: Kambiz Azarian Yazdi, San Diego, CA (US); Jing Jiang, San Diego, CA (US); Tingfang Ji, San Diego, CA (US); John Edward Smee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 241 days.

(21) Appl. No.: 14/963,814

(22) Filed: Dec. 9, 2015

(65) Prior Publication Data

US 2016/0295557 A1  Oct. 6, 2016

Related U.S. Application Data

(60) Provisional application No. 62/140,298, filed on Mar. 30, 2015.

(51) Int. Cl.
*H04W 72/04* (2023.01)
*H04L 5/00* (2006.01)
(Continued)

(52) U.S. Cl.
CPC ......... *H04W 72/042* (2013.01); *H04L 1/0026* (2013.01); *H04L 1/0027* (2013.01);
(Continued)

(58) Field of Classification Search
None
See application file for complete search history.

(56) References Cited

U.S. PATENT DOCUMENTS 9,083,501 B2    7/2015   Luo et al.
2005/0207367 A1  9/2005   Onggosanusi et al.
(Continued)

FOREIGN PATENT DOCUMENTS

EP    2782289 A2   9/2014
EP    2827518 A1   1/2015
(Continued)

OTHER PUBLICATIONS

ISA/EP, International Search Report and Written Opinion of the International Searching Authority, Int'l. App. No. PCT/US2016/020978, dated May 27, 2016, European Patent Office, Rijswijk, NL, 17 pgs.
(Continued)

*Primary Examiner* — Jeffrey M Rutkowski
*Assistant Examiner* — Mehedi S Aley
(74) *Attorney, Agent, or Firm* — Holland & Hart LLP

(57) ABSTRACT

A transmitter may allocate resources across multiple links for a transmission to a receiver. The transmitter may transmit a resource grant to the receiver. The transmission may include a data packet allocated across multiple links, and pilot signals on a number of links. The receiver may use an indicator included with the resource grant to trigger measurement of channel quality for links with pilot signals.

30 Claims, 15 Drawing Sheets

(51) Int. Cl.
*H04L 1/1867* (2023.01)
*H04L 1/1607* (2023.01)
*H04L 1/00* (2006.01)
*H04W 72/08* (2009.01)
*H04W 24/08* (2009.01)

(52) U.S. Cl.
CPC .......... *H04L 1/1671* (2013.01); *H04L 1/1893* (2013.01); *H04L 5/001* (2013.01); *H04W 72/0413* (2013.01); *H04W 72/082* (2013.01); *H04L 5/0048* (2013.01); *H04L 5/0051* (2013.01); *H04L 5/0053* (2013.01); *H04L 5/0055* (2013.01); *H04L 5/0057* (2013.01); *H04W 24/08* (2013.01)

(56) References Cited

U.S. PATENT DOCUMENTS

| | | | |
|---|---|---|---|
| 2006/0171353 A1* | 8/2006 | Nagata | H04L 27/2601 370/445 |
| 2007/0260956 A1* | 11/2007 | Terry | H04B 7/0632 714/748 |
| 2009/0238121 A1* | 9/2009 | Kotecha | H04L 5/0057 370/329 |
| 2010/0074211 A1* | 3/2010 | Kim | H04L 1/1671 370/329 |
| 2011/0141959 A1* | 6/2011 | Damnjanovic | H04L 1/1887 370/311 |
| 2011/0243012 A1* | 10/2011 | Luo | H04L 5/0055 370/252 |
| 2011/0243079 A1* | 10/2011 | Chen | H04B 7/0639 370/329 |
| 2012/0188976 A1* | 7/2012 | Kim | H04W 52/146 370/329 |
| 2013/0072209 A1* | 3/2013 | Haartsen | H04W 72/082 455/78 |
| 2013/0107861 A1* | 5/2013 | Cheng | H04W 72/042 370/331 |
| 2013/0142113 A1* | 6/2013 | Fong | H04J 11/00 370/328 |
| 2013/0170457 A1 | 7/2013 | Pelletier et al. | |
| 2013/0250886 A1* | 9/2013 | Zhou | H04W 72/0406 370/329 |
| 2014/0010126 A1 | 1/2014 | Sayana et al. | |
| 2014/0204856 A1 | 7/2014 | Chen et al. | |
| 2014/0211722 A1 | 7/2014 | Pietraski et al. | |
| 2014/0269600 A1* | 9/2014 | Lee | H04L 5/0007 370/329 |
| 2015/0085680 A1* | 3/2015 | Vrzic | H04L 1/1867 370/252 |
| 2016/0028521 A1 | 1/2016 | Shimezawa et al. | |

FOREIGN PATENT DOCUMENTS

| | | |
|---|---|---|
| JP | 2009171028 A | 7/2009 |
| JP | 2013046249 A | 3/2013 |
| JP | 2015519804 A | 7/2015 |
| WO | WO-2011127098 A1 | 10/2011 |
| WO | WO-2014048189 A1 | 4/2014 |
| WO | WO-2014116413 A1 | 7/2014 |
| WO | WO-2014142122 A1 | 9/2014 |

OTHER PUBLICATIONS

ETSI: "Removal of Technical Content in 36.521-1, V11.3.0 and Substitution with Pointer to the Next Release", 3GPP TSG-RAN WG5 Meeting #62, R5-140125, Prague, Czech Republic, Feb. 10-14, 2014, 11 Pages.

* cited by examiner

EVENT TRIGGERED MULTI-LINK CHANNEL QUALITY MEASUREMENT AND REPORT FOR MISSION CRITICAL APPLICATIONS

CROSS REFERENCES

The present application for patent claims priority to U.S. Provisional Patent Application No. 62/140,298 by Azarian Yazdi et al., entitled "Event Triggered Multi-Link Channel Quality Measurement and Report for Mission Critical Applications," filed Mar. 30, 2015, assigned to the assignee hereof.

BACKGROUND

Field of Disclosure

The following relates generally to wireless communication, and more specifically to event triggered multi-link channel quality measurement and report for mission critical applications.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

For some transmissions, such as low latency mission critical transmissions, low error rates are desired. In order to support high levels of reliability with low latency levels, transmissions may need to be successfully received with minimal retransmissions, such as one or less.

SUMMARY

Systems, methods, and apparatuses for event triggered multi-link channel quality measurement and report for mission critical applications are described. A transmitter may allocate resource blocks for a transmission of a data packet and pilot signals on a set of component carriers (CCs). The transmitter may transmit the pilot signals on two or more CCs. A receiver may receive a resource grant that includes an allocation of resource blocks for a downlink transmission on the set of CCs. The receiver may receive a data packet across at least a portion of the set of CCs. The receiver may further receive a pilot signal on two or more CCs and may perform channel quality indicator (CQI) measurements in response to an indication received with the resource grant. The CQI measurements may be based on the pilot signals for the two or more CCs. The indication may be transmitted from the transmitter after determining that a number of the CCs do not have channel measurements which were performed within a time threshold. In some examples, transmitting CQI data includes transmitting CQI data for each of the two or more CCs on a single CC. The transmitter may receive CQI data on a single CC based on measurements of the pilot signals on two or more CCs, the measurements being triggered by the allocation of the resource blocks. The receiver may transmit a negative acknowledgement (NACK) in response to receiving the data packet. The transmitter may reallocate resource blocks for retransmission of the data packet across at least a portion of the set of CCs, the reallocating may be based on the received CQI data. The receiver may receive a second resource grant that includes a reallocation of resource blocks for retransmission of the data packet across at least a portion of the CCs, where the reallocation may be based on the CQI data.

A method of wireless communication is described. The method may include receiving a resource grant that includes an allocation of resource blocks for a downlink transmission on a plurality of component carriers, receiving a data packet across at least a portion of the plurality of component carriers, receiving a pilot signal on two or more of the plurality of component carriers, and performing CQI measurements in response to an indication received with the resource grant, the CQI measurements based at least in part on the pilot signals for the two or more of the plurality of component carriers.

An apparatus for wireless communication is described. The apparatus may include means for receiving a resource grant that includes an allocation of resource blocks for a downlink transmission on a plurality of component carriers, means for receiving a data packet across at least a portion of the plurality of component carriers, means for receiving a pilot signal on two or more of the plurality of component carriers, and means for performing CQI measurements in response to an indication received with the resource grant, the CQI measurements based at least in part on the pilot signals for the two or more of the plurality of component carriers.

A further apparatus for wireless communication is described. The apparatus may include a processor, memory in electronic communication with the processor, and instructions stored in the memory and operable, when executed by the processor, to cause the processor to receive a resource grant that includes an allocation of resource blocks for a downlink transmission on a plurality of component carriers, receive a data packet across at least a portion of the plurality of component carriers, receive a pilot signal on two or more of the plurality of component carriers, and perform CQI measurements in response to an indication received with the resource grant, the CQI measurements based at least in part on the pilot signals for the two or more of the plurality of component carriers.

A non-transitory computer-readable medium storing code for wireless communication is described. The code may include instructions executable to receive a resource grant that includes an allocation of resource blocks for a downlink transmission on a plurality of component carriers, receive a data packet across at least a portion of the plurality of component carriers, receive a pilot signal on two or more of the plurality of component carriers, and perform CQI measurements in response to an indication received with the resource grant, the CQI measurements based at least in part on the pilot signals for the two or more of the plurality of component carriers.

Some examples of the method, apparatuses, or non-transitory computer-readable medium described herein may further include processes, features, means, or instructions for transmitting CQI data based at least in part on the CQI measurements. Additionally or alternatively, in some examples transmitting CQI data comprises transmitting CQI data for each of the two or more of the plurality of component carriers on a single component carrier.

In some examples of the method, apparatuses, or non-transitory computer-readable medium described herein, receiving the data packet across at least the portion of the plurality of component carriers comprises receiving the data packet across at least the portion of the plurality of component carriers in accordance to a component carrier weighting based at least in part on a most recently transmitted CQI data for one or more of the plurality of component carriers. Additionally or alternatively, some examples may include processes, features, means, or instructions for transmitting CQI data based at least in part on CQI measurements made of the two or more of the plurality of component carriers, transmitting a NACK in response to the receiving of the data packet, and receiving a second resource grant that includes a reallocation of resource blocks for a retransmission of the data packet across at least a portion of the plurality of component carriers, the reallocation based at least in part on the CQI data.

Some examples of the method, apparatuses, or non-transitory computer-readable medium described herein may further include processes, features, means, or instructions for transmitting CQI data based at least in part on CQI measurements made of the two or more of the plurality of component carriers with an acknowledgement (ACK) or NACK. Additionally or alternatively, in some examples the resource grant is received on a shortened transmission time interval (TTI).

In some examples of the method, apparatuses, or non-transitory computer-readable medium described herein, receiving the pilot signal on two or more of the plurality of component carriers comprises receiving at least one of a zero-power channel state information reference signal (CSI-RS) or a nonzero-power channel state information (CSI)-RS on the two or more of the plurality of component carriers. Additionally or alternatively, some examples may include processes, features, means, or instructions for receiving the indication with the resource grant, wherein the indication indicates that a receiving UE is to measure interference from neighboring base stations using the zero-power CSI-RS.

Some examples of the method, apparatuses, or non-transitory computer-readable medium described herein may further include processes, features, means, or instructions for receiving the indication with the resource grant, wherein the indication indicates that a receiving UE is to measure instantaneous channel conditions from a serving base station using the nonzero-power CSI-RS. Additionally or alternatively, some examples may include processes, features, means, or instructions for receiving the indication with the resource grant, the indication triggering a receiving UE to measure pilot signals and to report instantaneous channel conditions from a serving base station and interference from neighboring base stations.

A method of wireless communication is described. The method may include allocating resource blocks for a transmission of a data packet and pilot signals on a plurality of component carriers, transmitting the pilot signals on two or more of the plurality of component carriers, and receiving CQI data on a single component carrier based at least in part on measurements of the pilot signals on the two or more of the plurality of component carriers, the measurements being triggered by the allocation of the resource blocks.

An apparatus for wireless communication is described. The apparatus may include means for allocating resource blocks for a transmission of a data packet and pilot signals on a plurality of component carriers, means for transmitting the pilot signals on two or more of the plurality of component carriers, and means for receiving CQI data on a single component carrier based at least in part on measurements of the pilot signals on the two or more of the plurality of component carriers, the measurements being triggered by the allocation of the resource blocks.

A further apparatus for wireless communication is described. The apparatus may include a processor, memory in electronic communication with the processor, and instructions stored in the memory and operable, when executed by the processor, to cause the processor to allocate resource blocks for a transmission of a data packet and pilot signals on a plurality of component carriers, transmit the pilot signals on two or more of the plurality of component carriers, and receive CQI data on a single component carrier based at least in part on measurements of the pilot signals on the two or more of the plurality of component carriers, the measurements being triggered by the allocation of the resource blocks.

A non-transitory computer-readable medium storing code for wireless communication is described. The code may include instructions executable to allocate resource blocks for a transmission of a data packet and pilot signals on a plurality of component carriers, transmit the pilot signals on two or more of the plurality of component carriers, and receive CQI data on a single component carrier based at least in part on measurements of the pilot signals on the two or more of the plurality of component carriers, the measurements being triggered by the allocation of the resource blocks.

Some examples of the method, apparatuses, or non-transitory computer-readable medium described herein may further include processes, features, means, or instructions for transmitting the data packet across at least a portion of the plurality of component carriers. Additionally or alternatively, some examples may include processes, features, means, or instructions for reallocating resource blocks for a retransmission of the data packet across at least a portion of the plurality of component carriers, the reallocating based at least in part on the received CQI data.

In some examples of the method, apparatuses, or non-transitory computer-readable medium described herein, allocating resource blocks for the transmission of the data packet and pilot signals on the plurality of component carriers comprises allocating resource blocks based at least in part on a most recently received CQI data for one or more of the plurality of component carriers. Additionally or alternatively, some examples may include processes, features, means, or instructions for determining a time period associated with a most recently received CQI data for one or more of the plurality of component carriers, and transmitting the pilot signals on each of the plurality of component carriers comprises transmitting the pilot signals on the two or more of the plurality of component carriers based at least in part on the time period associated with the most recently received CQI data.

In some examples of the method, apparatuses, or non-transitory computer-readable medium described herein, determining the time period associated with the most recently received CQI data comprises determining that the most recently received CQI data has been received for a duration of time in excess of a time threshold. Additionally or alternatively, some examples may include processes, features, means, or instructions for transmitting a resource grant, wherein the resource grant conveys the allocation of the resource blocks for the transmission of the data packet and pilot signals on the plurality of component carriers.

Some examples of the method, apparatuses, or non-transitory computer-readable medium described herein may further include processes, features, means, or instructions for including an indication in the resource grant that a receiving UE is to measure the pilot signals and report instantaneous channel conditions from a serving base station and interference from neighboring base stations. Additionally or alternatively, in some examples the resource grant is transmitted on a shortened TTI.

Some examples of the method, apparatuses, or non-transitory computer-readable medium described herein may further include processes, features, means, or instructions for receiving at least one ACK or NACK in response to the transmitting of the data packet. Additionally or alternatively, some examples may include processes, features, means, or instructions for receiving the CQI data with the at least one ACK or NACK.

Some examples of the method, apparatuses, or non-transitory computer-readable medium described herein may further include processes, features, means, or instructions for receiving at least one NACK in response to the transmitting of the data packet, and retransmitting the data packet and the pilot signals in response to the at least one NACK. Additionally or alternatively, in some examples transmitting the pilot signals on the two or more of the plurality of component carriers comprises transmitting at least one of a zero-power channel state information reference signal (CSI-RS) or a nonzero-power CSI-RS on the two or more of the plurality of component carriers.

Some examples of the method, apparatuses, or non-transitory computer-readable medium described herein may further include processes, features, means, or instructions for transmitting an indication wherein the indication indicates that a receiving UE is to measure interference from neighboring base stations using the zero-power CSI-RS. Additionally or alternatively, some examples may include processes, features, means, or instructions for transmitting an indication wherein the indication indicates that a receiving UE is to measure instantaneous channel conditions from a serving base station using the nonzero-power CSI-RS.

In some examples of the method, apparatuses, or non-transitory computer-readable medium described herein, the data packet is a low-latency data packet.

The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, or apparatuses for event triggered multi-link channel quality measurement and report for mission critical applications. Some transmissions, such as mission critical transmissions, may require low error rates (e.g., 1e-4) or may be low latency (e.g., 500 µs). To support such transmissions, a high reliability is desired, such as successful delivery within few retransmission attempts, such as one or zero. Reliability may be increased by increasing the frequency diversity of transmissions. In order to increase reliability and frequency diversity, data packets may be transmitted across multiple links, such as multiple component carriers. When transmitting a data packet across multiple links, it may be beneficial to allocate more of the data packet on the links with a higher channel quality. As such, a first transmission may be allocated across multiple links. Further, it may be desired to have recent (i.e., within a time threshold) channel measurements when determining the link with the higher channel quality. The first transmission may also trigger the receiver to perform channel measurements, such as on links without recent channel measurements. To that end, the transmitter may include pilot signals on some or all of the multiple links. The pilot signals may be used by the receiver to perform channel measurements. An unsuccessful transmission, then, as indicated by the receiver transmitting a negative acknowledgement (NACK) signal to the transmitter, for example, may then result in the transmitter reallocating the data packet across the links for a retransmission. Reallocating the data packet may be based on the channel measurements performed so that the data packet is allocated to the link with the recently measured higher channel quality. By triggering channel measurements across multiple links so retransmission attempts may have updated channel quality measurements, reliability may be increased and the amount of retransmission attempts may be reduced.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
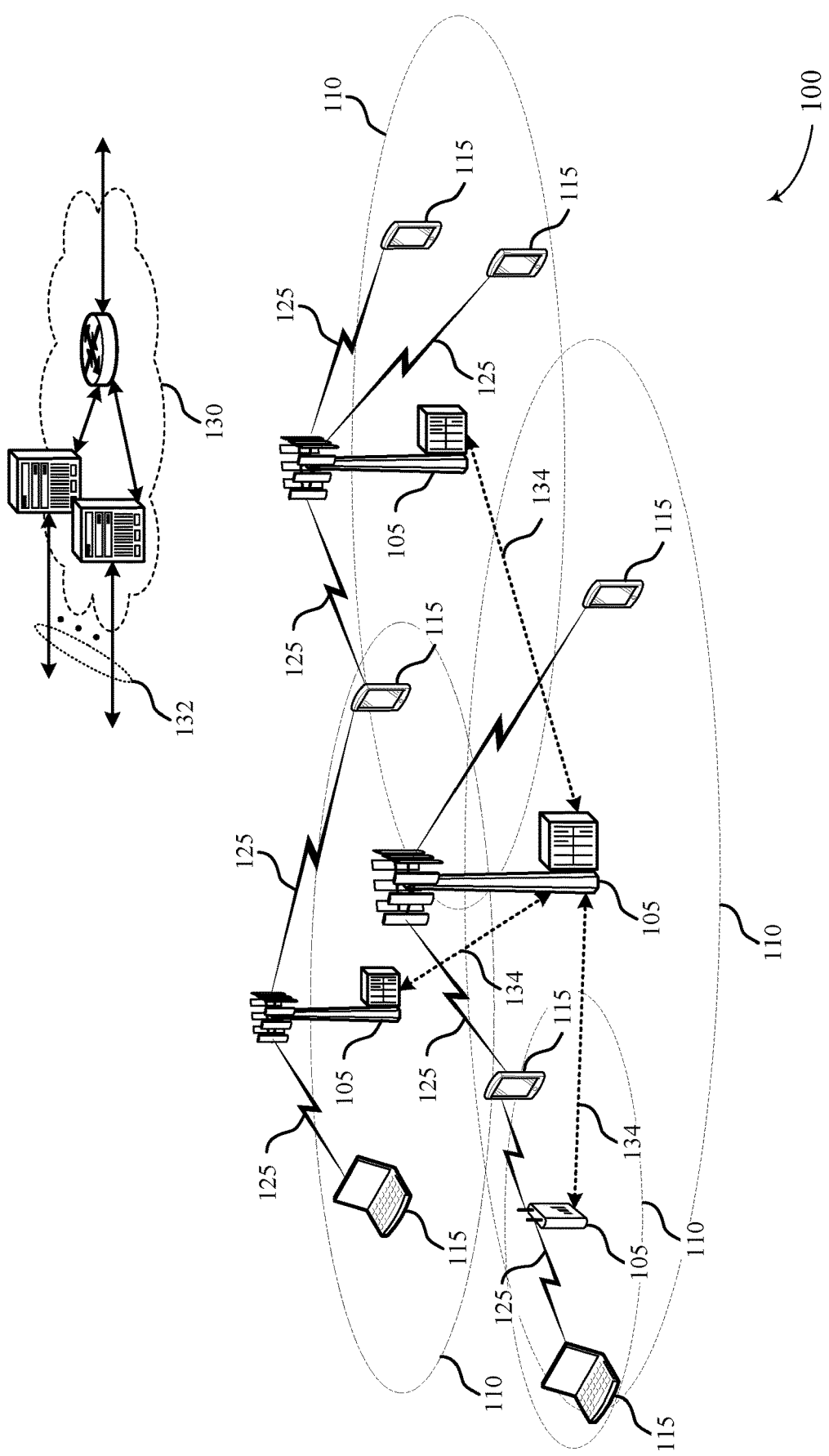
FIG. 1 illustrates an example of a wireless communications system that supports event triggered multi-link channel quality measurement and report for mission critical applications in accordance with various aspects of the present disclosure.

FIG. 1 illustrates an example of a wireless communications system 100 in accordance with various aspects of the present disclosure. The wireless communications system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., Si, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

HARQ may be a method of ensuring that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a NACK indicating a failed attempt to decode the information.

Data may be divided into logical channels, transport channels, and physical layer channels. Channels may also be classified into control channels and traffic channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and uplink shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, physical uplink control channel (PUCCH) for control data, and physical uplink shared channel (PUSCH) for user data.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some examples of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The term "component carrier" may refer to each of the multiple carriers utilized by a UE in carrier aggregation (CA) operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode.

A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., acknowledgement (ACK)/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some cases, wireless communications system 100 may utilize coverage enhancement (CE) techniques to improve the quality of a communication link 125 for UEs 115 located at a cell edge, operating with low power transceivers, or experiencing high interference or path loss. CE techniques may include increase transmission time interval (TTI) bundling, HARQ retransmission, PUSCH hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a NACK before retransmitting redundancy versions. This may be effective for users engaging in voice over Long Term evolution (VoLTE) or VOIP communications. In other cases, the number of HARQ retransmissions may also be increased, though the present disclosure relates to methods and apparatuses that may reduce the number of HARQ retransmissions that may be performed. Uplink data transmissions may be transmitted using frequency hopping to achieve frequency diversity. Beamforming may be used to increase the strength of a signal in a particular direction, or the transmission power may simply be increased.

A base station 105 may gather channel condition information from a UE 115 in order to efficiently configure and schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as cell-specific reference signals (CRS) or channel state information (CSI)-RS. RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the best subbands, or configured reports in which the subbands reported are selected by the base station 105.

A transmitter, such as a base station 105, may transmit a data packet and pilot signals allocated across multiple links, such as multiple CCs. A receiver, such as a UE 115, may perform channel quality measurements for each of the CCs for which a pilot signal was received. The receiver may transmit channel quality data to the transmitter in response to receiving the pilot signals. The channel quality data may be transmitted on the CC for which the measurement was performed, or a different CC. Channel quality data for multiple CCs may be transmitted on a single CC. The receiver may further transmit an indication of whether the data packet was successfully received or not. For example the receiver may transmit a NACK if the data packet was not successfully received. The transmitter may use the channel quality data when retransmitting the data packet. For example, the transmitter may reallocate the data packet across a CC, or multiple CCs, with sufficient or preferred channel quality based on the channel quality measurements. The transmitter may then retransmit the data packet.

Figure 2:
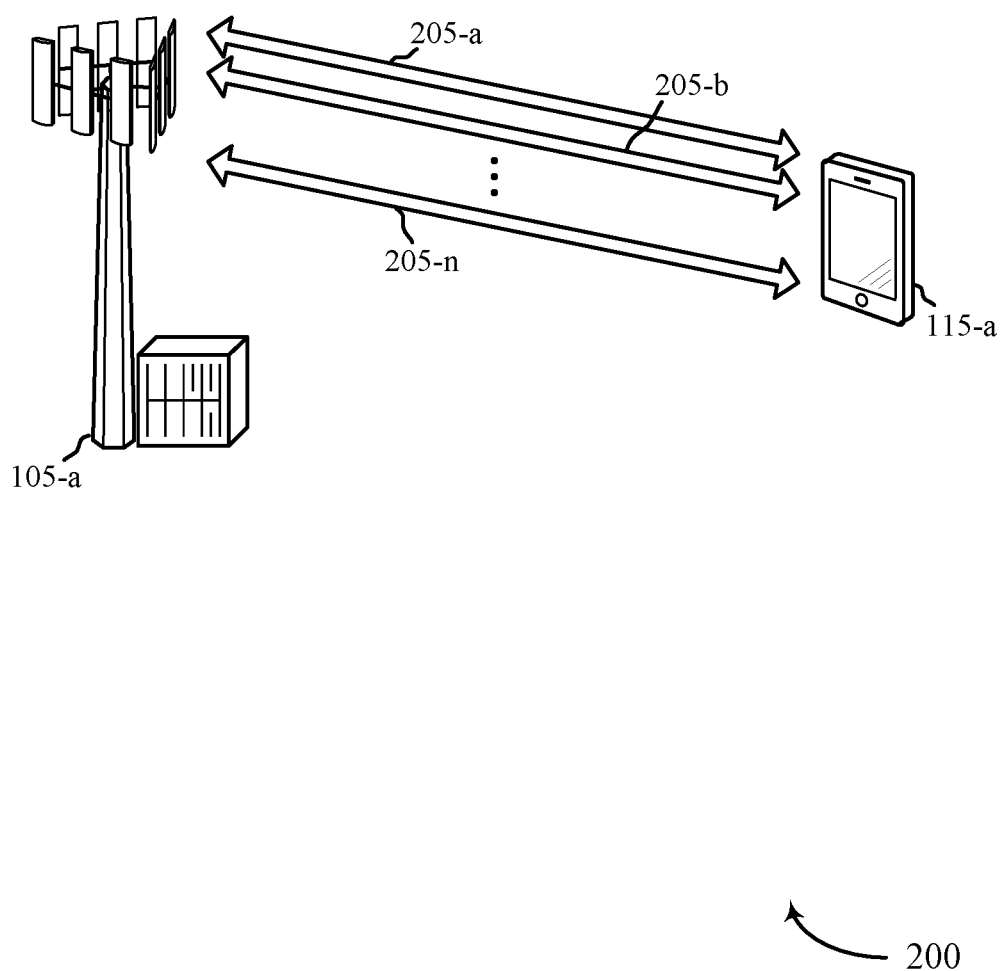
FIG. 2 illustrates an example of a wireless communications subsystem that supports event triggered multi-link channel quality measurement and report for mission critical applications in accordance with various aspects of the present disclosure.

FIG. 2 illustrates an example of a wireless communications subsystem 200 for event triggered multi-link channel quality measurement and report for mission critical applications in accordance with various aspects of the present disclosure. Wireless communications subsystem 200 may include a UE 115-*a*, which may be an example of a UE 115 described herein with reference to FIG. 1. Wireless communications subsystem 200 may also include a base station 105-*a*, which may be an example of a base station 105 described herein with reference to FIG. 1.

A base station 105-*a* may communicate with a UE 115-*a* using carrier aggregation. Carrier aggregation may include communicating using a plurality of CCs 205 (e.g., CC 205-*a* through CC 205-*n*). CCs 205 may communicate different information between CCs 205, or a subset of CCs 205 may redundantly communicate the same information. In some cases, information, such as a data packet, may be allocated across multiple CCs 205. By allocating information on multiple CCs 205 (i.e., multiple links) frequency diversity may be increased, which may help create conditions appropriate for low latency data and low error rates.

The transmitter, such as the base station 105-*a*, may allocate resource blocks (RBs) on a number of CCs 205 for a transmission to be received by the receiver, such as the UE 115-*a*. In some cases, the base station 105-*a* may transmit pilot signals on a number of CCs 205. The allocation of RBs may also include an indication to the receiver that the receiver is to use the pilot signals to perform channel measurements. For example, the base station 105-*a* may transmit pilot signals on two or more of the CCs 205 serving the UE 115-*a*. The pilot signals may include cell-specific reference signals (CRS), zero-power or nonzero-power channel state information reference signals (CSI-RS), other pilot signals, and combinations thereof. The UE 115-*a* may perform channel measurements based on the pilot signals transmitted from the base station 105-*a*. For example, the UE 115-*a* may perform channel quality information (CQI) measurements for a number of CCs 205 with pilot signals, such as all of the CCs 205 with pilot signals. After performing the channel measurements, the UE 115-*a* may transmit channel measurement information based on the channel measurements, such as CQI data, to be received by the base station 105-*a*. The channel measurement information may be transmitted from the UE 115-*a* to the base station 105-*a* on the same CC 205 for which the measurement was performed, or a different CC 205 than the CC 205 for which the measurement was performed. In some cases, channel measurement information for multiple CCs 205 may be transmitted to the base station 105-*a* using a single CC 205.

The base station 105-*a* may allocate RBs on a number of CCs 205 for transmission of data packets. For example, the base station 105-*a* may transmit a data packet across CCs 205-*a* and 205-*b*. The base station 105-*a* may transmit a data packet across a single CC 205, a number of CCs 205, or all CCs 205 serving the UE 115-*a*. When transmitting the data packet across multiple CCs 205 some, all, or none of the data packet may be repeated on multiple CCs 205. Instead, the data packet may be spread out across some or all of the multiple CCs 205. It should be noted that pilot signals and data packets may be transmitted on the same CC 205 or may be transmitted on different CCs 205, or a combination thereof.

In some cases, the base station 105-*a* may transmit an indicator, which the UE 115-*a* may receive, which indicates to the UE 115-*a* to perform channel measurements. The indicator may indicate for which CC 205, or for which base station 105, to perform channel measurements. Additionally or alternatively, the indicator may indicate which pilot signals to use for channel measurements. The indicator may trigger the UE 115-*a* to measure and report instantaneous channel conditions from a serving base station 105-*a*, and interference from at least one neighboring base station 105. For example, the indicator may trigger the UE 115-*a* to use zero-power CSI-RS to measure interference from neighboring base stations 105. Additionally or alternatively, the indicator may trigger the UE 115-*a* to use nonzero-power CSI-RS to measure instantaneous channel conditions from a serving cell, such as the base station 105-*a*. The indicator may be determined, predefined, or signaled by the base station 105-*a* or another network entity. The base station 105-*a* may determine the indicator based on measurement times for different CCs 205. For example, the base station 105-*a* may determine a time period associated with the most recent channel measurements for different CCs 205. If the time period for the most recent channel measurements for a CC 205 exceeds a time threshold, the base station 105-*a* may determine that new channel measurements are needed for the CC 205 and indicate as much using the indicator. As such, the base station 105-*a* may only initiate channel measurements for CCs 205 which are likely to need new channel measurements.

Upon receiving the channel measurement information, the transmitter, such as the base station 105-*a*, may use the channel measurement information to determine the next allocation or reallocation of pilot signals and data. For example, if the initial transmission was not successful, the base station 105-*a* may reallocate RBs to allocate more RBs on CCs 205 which had preferable channel conditions, and retransmit the data across the newly reallocated RBs of the CCs 205. If the initial transmission was successful the transmitter may use the channel measurement information when allocating the next transmission to the receiver. In some cases, the transmitter may allocate data on CCs 205 with recent measurements which are adequate for the data (e.g., the measurements exceed at least one measurement threshold), while allocating pilot signals on CCs 205 which do not have recent measurements, or all of the CCs 205. If retransmission is necessary, the transmitter may reallocate data on CCs 205 with preferred channel conditions, which may be some, all, or none of the CCs 205 allocated for the initial transmission, while allocating some, all, or none of the CCs 205 for pilot signals, such as depending on how recently the channel measurements for each CC 205 was performed. It should be noted that although the base station 105-*a* is described as the transmitter and the UE 115-*a* is described as the receiver, either the base station 105-*a* or the UE 115-*a* may act as the transmitter, and either the base station 105-*a* or the UE 115-*a* may act as the receiver.

Figure 3:
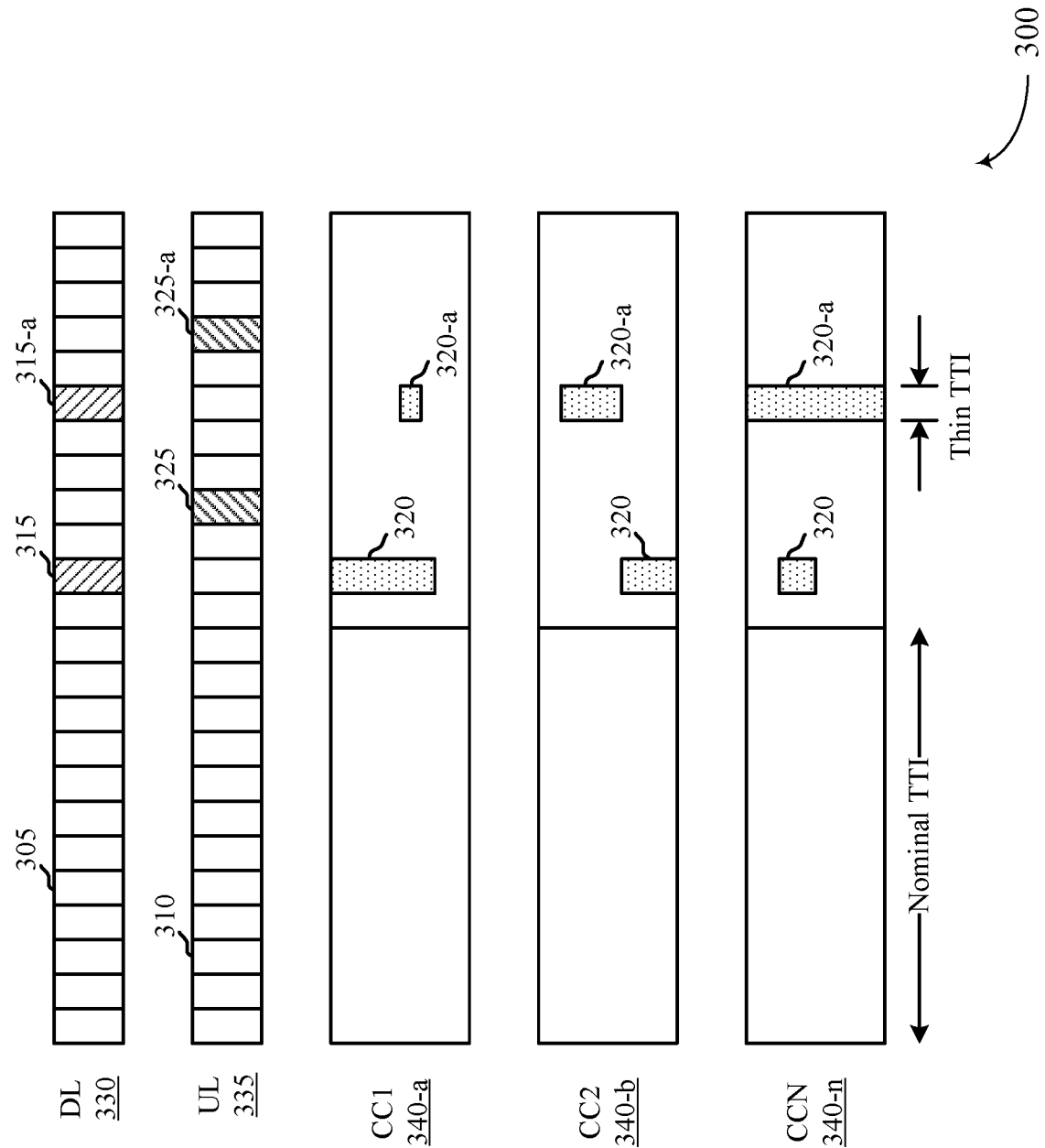
FIG. 3 illustrates an example of communication channels that support event triggered multi-link channel quality measurement and report for mission critical applications in accordance with various aspects of the present disclosure.

FIG. 3 illustrates an example of communication channels 300 for event triggered multi-link channel quality measurement and report for mission critical applications in accordance with various aspects of the present disclosure. The communication channels 300 may include channels established between a transmitter and a receiver. The transmitter or receiver may be a base station 105, which may be an example of a base station 105 described herein with reference to FIGS. 1-2. Additionally or alternatively, the transmitter or receiver may be a UE 115, which may be an example of a UE 115 described herein with reference to FIGS. 1, 2.

The communication channels 300 may include a DL channel 330 and an UL channel 335. In some cases, the DL channel 330 may represent an UL channel and the UL channel 335 may represent a DL channel, and the CCs 340 may be channels used for transmission from the receiver to the transmitter. The DL channel 330 and the UL channel 335 may be configured for, or capable of, operating using shortened transmission time intervals (TTIs), such as thin TTIs 305 and 310. The DL channel 330 may include communications from a base station 105, which may include features of the base stations 105 from FIGS. 1, 2, to a UE 115, which may include features of the UEs 115 from FIGS. 1, 2. The UL channel may include communications from the UE 115 to the base station 105. Similarly, the DL channel 330 may include communications from a UE 115 to a base station 105, and the UL channel 335 may include communications from a base station 105 to a UE 115. Further, the DL channel 330 and UL channel 335 may be between base stations 105, or may be between UEs 115. The communication channels 300 may further include CCs CC1 340-*a* through CCN 340-*n*. The CCs 340 may be carriers of the DL channel 330 or the UL channel 335. The CCs 340 may carry data from the transmitter to the receiver. The CCs may use nominal TTIs or shortened TTIs, such as thin TTIs.

The DL channel 330 may include DL resource grants 315. The DL resource grants 315 may indicate to the receiver the resources to be used for transmitting data and pilot signals. For example the DL resource grant 315 may indicate to the receiver that resource blocks (RBs) 320 of CC1 340-*a* through CCN 340-*n* are scheduled to carry transmissions from the transmitter to the receiver. The DL resource grant 315 may further include, or be transmitted with, an indicator as described above with reference to FIG. 2. The indicator may indicate to the receiver the measurements to perform or the resources to use for measurements. The transmitter may determine the RBs 320 to allocate based on recent channel measurements for the CCs 340. The transmitter may allocate more RBs 320 on CCs 340 which have recent channel measurement results, or on CCs 340 which have channel conditions preferable to other CCs 340. In some cases, the transmitter may allocate fewer RBs 320 on CCs 340 for which recent channel measurements exceed a time threshold. Further, if the recent channel measurements exceed a time threshold since the channel measurements were performed, the transmitter may use the indicator to indicate to the receiver for which CCs 340 to perform channel measurements.

As indicated by the DL resource grant 315, the receiver may receive communications from the transmitter on the allocated RBs 320 of the CCs 340. The allocated RBs 320 may include pilot signals or at least one data packet. In some cases, the allocated RBs 320 may be allocated for both pilot signals and at least one data packet. Alternatively, at least one data packet may be allocated across one or more of the CCs 340, while pilot signals may be allocated on some or all of the CCs 340, including the CCs 340 where data is not transmitted. Indeed, data and pilot signals may be allocated to RBs 320 on the same CC 340, on different CCs 340, or a combination thereof. The allocated RBs 320 may include thin TTIs. The allocated RBs 320 may be a HARQ traffic transmission. The allocated RBs 320 may be transmitted simultaneously with the DL resource grant 315. The receiver may transmit acknowledgement information 325 in response to receiving the allocated RBs 320. The acknowledgement information 325 may include an ACK or NACK which may indicate a successful reception or unsuccessful reception, respectively. The acknowledgement information 325 may also include channel measurement information as described above with reference to FIG. 2. The channel measurement information may include CQI data for each of the CCs 340 for which the receiver performed CQI measurements, as indicated by the indicator.

The transmitter may receive the acknowledgement information 325 and may use it to determine channel conditions or if reception of the previous transmission was successful. The receiver may transmit the acknowledgement information 325 at least two TTIs after the DL resource grant 315, since one TTI may be used to receive the DL resource grant 315 and RBs 320 and another TTI may be used to decode the DL resource grant 315 and the RBs 320. Upon reception of the acknowledgement information 325, the transmitter may determine that a NACK was transmitted and retransmission is necessary. Further, the transmitter may analyze the acknowledgement information 325 and determine channel conditions for CCs 340. The channel conditions may be based on the most recent channel measurements, which may have been performed based on pilot signals of the allocated RBs 320 indicated by the DL resource grant 315. The most recent channel measurements may have been performed before the allocated RBs 320 were received. Based on the channel conditions, the transmitter may reallocate RBs 320-*a* for an attempted retransmission. The transmitter may transmit a new DL resource grant 315-*a* indicating the reallocated RBs 320-*a*. The RBs may be reallocated so that more RBs 320-*a* are allocated on CCs 340 with preferable channel conditions to other CCs 340.

For example, the recent channel conditions may have indicated to the transmitter to allocate more RBs on CC1 340-*a*, which may have had better channel conditions than other CCs 340 (e.g., CC2 340-*b* and CCN 340-*n*), as a part of the DL resource grant 315. The DL resource grant 315 may further indicate that the receiver is to perform channel measurements for CC1 340-*a* and CCN 340-*n* (e.g., if the most recent channel measurements exceed a time threshold since they were performed). The receiver may not have correctly received the transmission allocated across the RBs 320. As such, the receiver may transmit channel conditions for CC1 340-*a* and CCN 340-*n*, as well as a NACK, as a part of acknowledgement information 325. The transmitter may analyze the acknowledgement information 325 and may determine to allocate RBs differently for CC1 340-*a* and CCN 340-*n*, for retransmission. The transmitter may determine that CCN 340-*n* has channel conditions preferable to the other CCs 340, and that CC1 340-*a* has inferior channel conditions to CC2 340-*b*. As such, the new DL resource grant 315-*a* may indicate more allocated RBs 320-*a* on CCN 340-*n* and fewer allocated RBs 320-*a* on CC1 340-*a*. The transmitter may allocate RBs 320-*a* on a different number of CCs 340 than the first allocation of RBs 320. In some cases, the transmitter may allocate most RBs 320-*a* on the channel with the best quality, such as CCN 340-*n*, while allocating at least one RB on other CCs 340 to maintain recent channel quality measurements. It should be noted that reallocating RBs may include changing the number of RBs allocated, or it may include changing which RBs are allocated.

By reallocating RBs based on event triggered channel measurements, the communication channels 300 may be more reliable and may increase the chances of successful transmission of data, or may increase the chances of successful retransmission of data. This may be helpful for mission critical data which may be low latency and demand low error rates. Though allocating RBs on multiple links and performing measurements on multiple links may cost extra resources, performance for mission critical data may benefit from the capacity and spectral diversity created by allocating RBs across multiple links. As such, transmitters may allocate RBs and trigger measurements across multiple links only if the recent channel measurements for the links exceed a time threshold.

Figure 4:
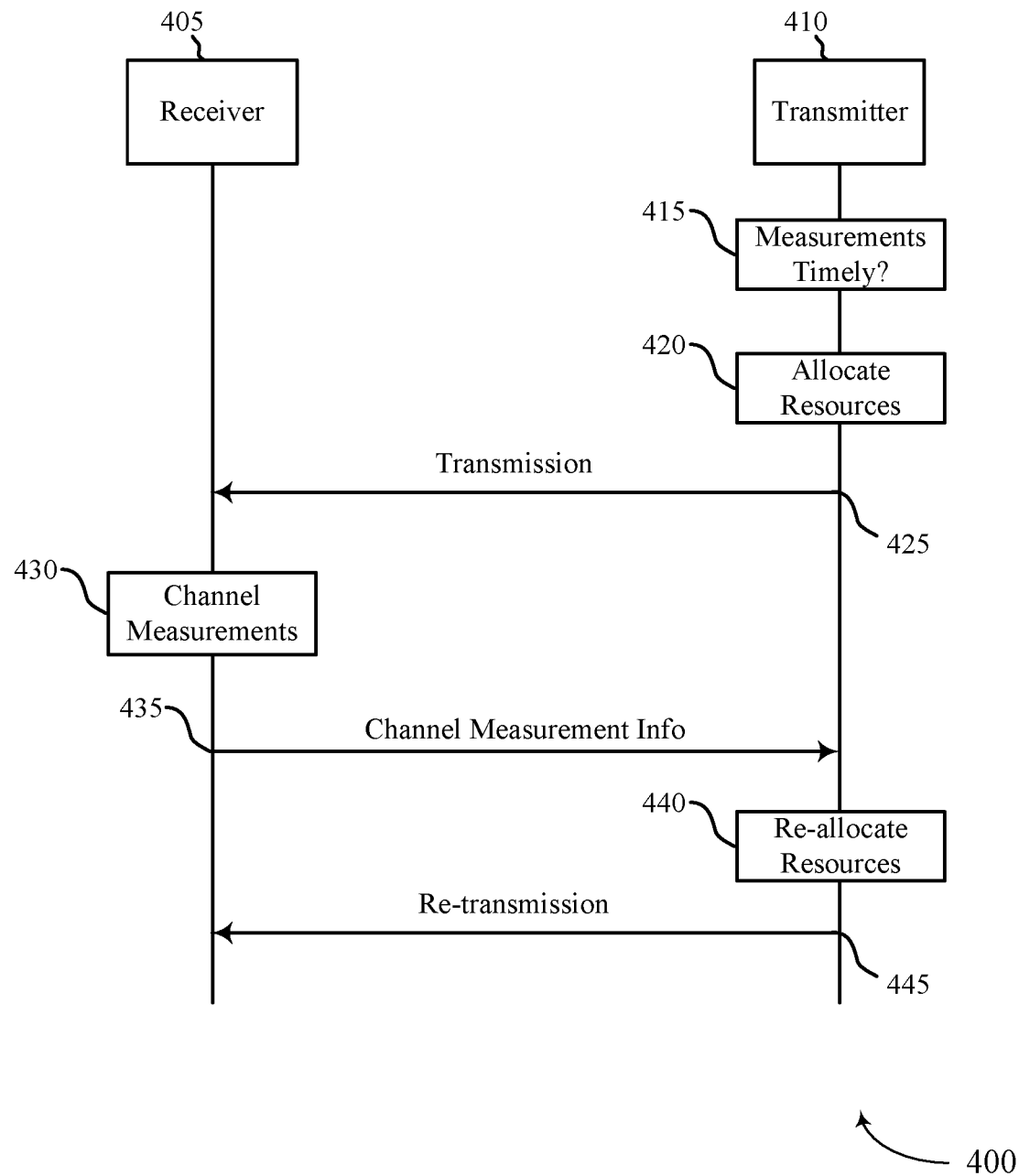
FIG. 4 illustrates an example of a process flow that supports event triggered multi-link channel quality measurement and report for mission critical applications in accordance with various aspects of the present disclosure.

FIG. 4 illustrates an example of a process flow 400 for event triggered multi-link channel quality measurement and report for mission critical applications in accordance with various aspects of the present disclosure. Process flow 400 may include a receiver 405, which may be an example of a base station 105 or a UE 115 described herein with reference to FIGS. 1-3. Process flow 400 may also include a transmitter 410, which may be an example of a base station 105 or a UE 115 described herein with reference to FIGS. 1-3.

At block 415, transmitter 410 may determine a time period associated with a most recently received CQI data for one or more of a set of component carriers. In some examples determining the time period associated with the most recently received CQI data includes determining that the most recently received CQI data has been received for a duration of time in excess of a time threshold.

At block 420, the transmitter 410 may allocate resource blocks for a transmission of a data packet and pilot signals on the set of component carriers. In some examples allocating resource blocks for the transmission of the data packet and pilot signals on the plurality of component carriers includes allocating resource blocks based at least in part on a most recently received CQI data for one or more of the plurality of component carriers. It should be noted that the data packet and pilot signals may be allocated to the same component carriers, allocated to different component carriers, or a combination thereof.

At block 425, the transmitter 410 may transmit a resource grant, wherein the resource grant conveys the allocation of the resource blocks for the transmission of the data packet and pilot signals on the set of component carriers. The transmitter 410 may include an indication in the resource grant that the receiver 405 is to measure the pilot signals and report instantaneous channel conditions from a serving base station and interference from neighboring base stations. The transmitter 410 may transmit an indication that receiver 405 is to measure interference from neighboring base stations using the zero-power CSI-RS. The transmitter 410 may transmit an indication that the receiver 405 is to measure instantaneous channel conditions from a serving base station using the nonzero-power CSI-RS. In some examples the resource grant is transmitted on a shortened TTI. The receiver 405 may receive a resource grant that includes an allocation of resource blocks for a downlink transmission on a set of component carriers. In some examples the resource grant is received on a shortened TTI. The transmitter 410 may transmit the pilot signals on two or more of the set of component carriers. In some examples transmitting the pilot signals on each of the plurality of component carriers includes transmitting the pilot signals on the two or more of the plurality of component carriers based at least in part on the time period associated with the most recently received CQI data. In some examples transmitting the pilot signals on the two or more of the plurality of component carriers includes transmitting at least one of a zero-power channel state information reference signal (CSI-RS) or a nonzero-power CSI-RS on the two or more of the plurality of component carriers. The receiver 405 may receive an indication with the resource grant, indicating that the receiver 405 is to measure interference from neighboring base stations using the zero-power CSI-RS. The receiver 405 may receive the indication with the resource grant, indicating that the receiver 405 is to measure instantaneous channel conditions from a serving base station using the nonzero-power CSI-RS. The receiver 405 may receive the indication with the resource grant, the indication triggering the receiver 405 to measure pilot signals and to report instantaneous channel conditions from a serving base station and interference from neighboring base stations. The transmitter 410 may transmit the data packet across at least a portion of the set of component carriers. In some examples the data packet is a low-latency data packet. The receiver 405 may receive a data packet across at least a portion of the set of component carriers. In some examples receiving the data packet across at least the portion of the plurality of component carriers may include receiving the data packet across at least the portion of the plurality of component carriers in accordance to a component carrier weighting based at least in part on a most recently transmitted CQI data for one or more of the plurality of component carriers. The receiver 405 may receive a pilot signal on two or more of the set of component carriers. In some examples receiving the pilot signal on two or more of the plurality of component carriers may include receiving at least one of a zero-power channel state information reference signal (CSI-RS) or a nonzero-power CSI-RS on the two or more of the plurality of component carriers.

At block 430, the receiver 405 may perform CQI measurements in response to an indication received with the resource grant, the CQI measurements based on the pilot signals for the two or more of the set of component carriers.

At block 435, the receiver 405 may transmit CQI data based on the CQI measurements. The transmitter 410 may receive CQI data on a single component carrier based on measurements of the pilot signals on the two or more of the set of component carriers, the measurements being triggered by the allocation of the resource blocks. The receiver 405 may transmit CQI data based on CQI measurements made of the two or more of the set of component carriers. In some examples transmitting CQI data may include transmitting CQI data for each of the two or more of the plurality of component carriers on a single component carrier. The receiver 405 may transmit a NACK in response to the receiving of the data packet. The receiver 405 may transmit CQI data based on CQI measurements made of the two or more of the set of component carriers with an ACK or NACK. The transmitter 410 may receive a ACK or NACK in response to the transmitting of the data packet. The transmitter 410 may receive the CQI data with the a ACK or NACK. The transmitter 410 may receive a NACK in response to the transmitting of the data packet.

At block 440, the transmitter 410 may reallocate resource blocks for a retransmission of the data packet across at least a portion of the set of component carriers, the reallocating based on the received CQI data.

At block 445, the transmitter 410 may retransmit the data packet and the pilot signals in response to the a NACK. The receiver 405 may receive a second resource grant that includes a reallocation of resource blocks for a retransmission of the data packet across at least a portion of the set of component carriers, the reallocation based on the CQI data.

Figure 5:
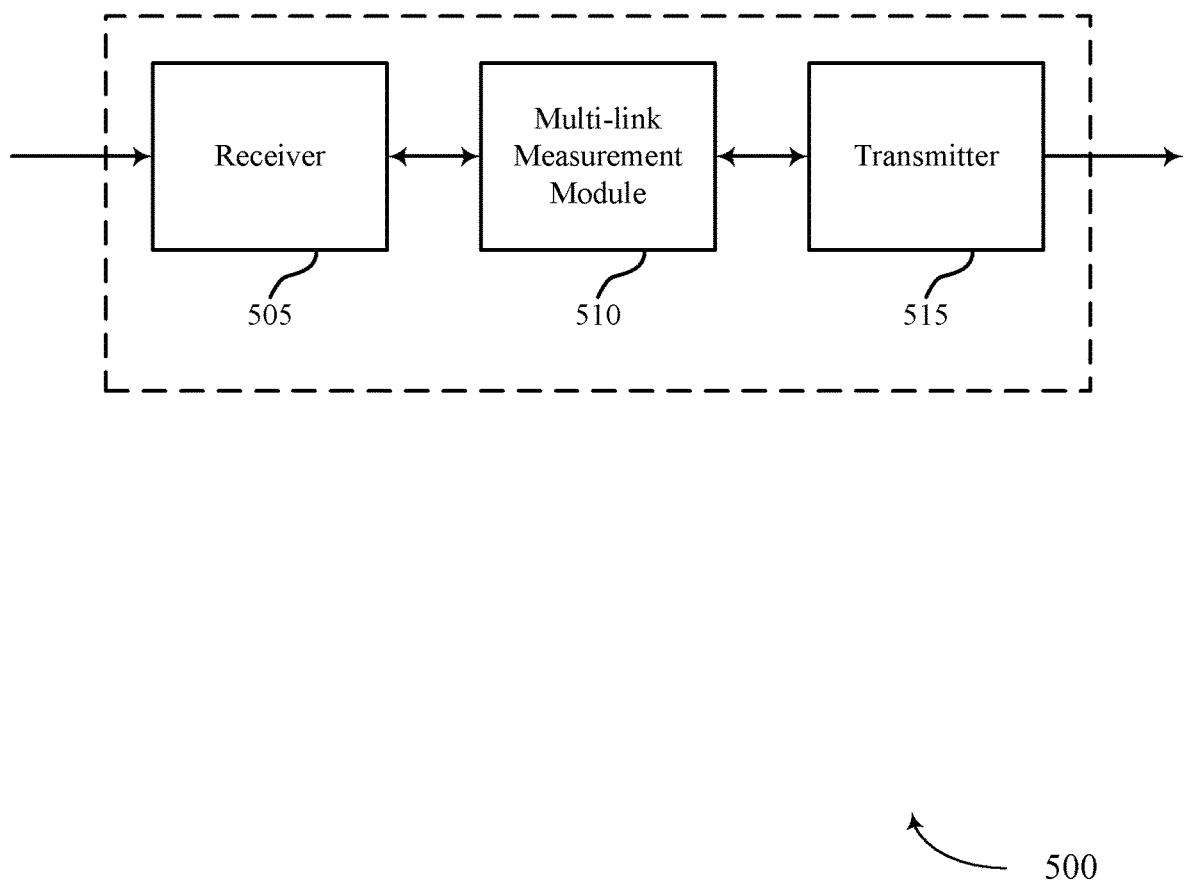
FIGS. 5-7 show block diagrams of wireless devices that support event triggered multi-link channel quality measurement and report for mission critical applications in accordance with various aspects of the present disclosure.

FIG. 5 shows a block diagram of a wireless device 500 configured for event triggered multi-link channel quality measurement and report for mission critical applications in accordance with various aspects of the present disclosure. Wireless device 500 may be an example of aspects of a base station 105 or UE 115 described with reference to FIGS. 1-4.

Wireless device 500 may include a receiver 505, a multi-link measurement module 510, or a transmitter 515. Wireless device 500 may also include a processor. Each of these components may be in communication with each other.

The components of wireless device 500 may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 505 may receive information such as packets, user data, or control information associated with various information channels (e.g., control channels, data channels, and information related to event triggered multi-link channel quality measurement and report for mission critical applications, etc.). Information may be passed on to the multi-link measurement module 510, and to other components of wireless device 500.

The multi-link measurement module 510 may perform actions based on whether the device 500 is configured as either a receiver or a transmitter. When the device 500 is configured as a receiver, the multi-link measurement module 510 may receive a resource grant that includes an allocation of resource blocks for a downlink transmission on a plurality of component carriers, receive a data packet across at least a portion of the plurality of component carriers, receive a pilot signal on two or more of the plurality of component carriers, and perform CQI measurements in response to an indication received with the resource grant, the CQI measurements based at least in part on the pilot signals for the two or more of the plurality of component carriers. When the device 500 is configured as a transmitter, the multi-link measurement module 510 may allocate resource blocks for a transmission of a data packet and pilot signals on a plurality of component carriers, transmit the pilot signals on two or more of the plurality of component carriers, receive CQI data on a single component carrier based at least in part on measurements of the pilot signals on the two or more of the plurality of component carriers, the measurements being triggered by the allocation of the resource blocks.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
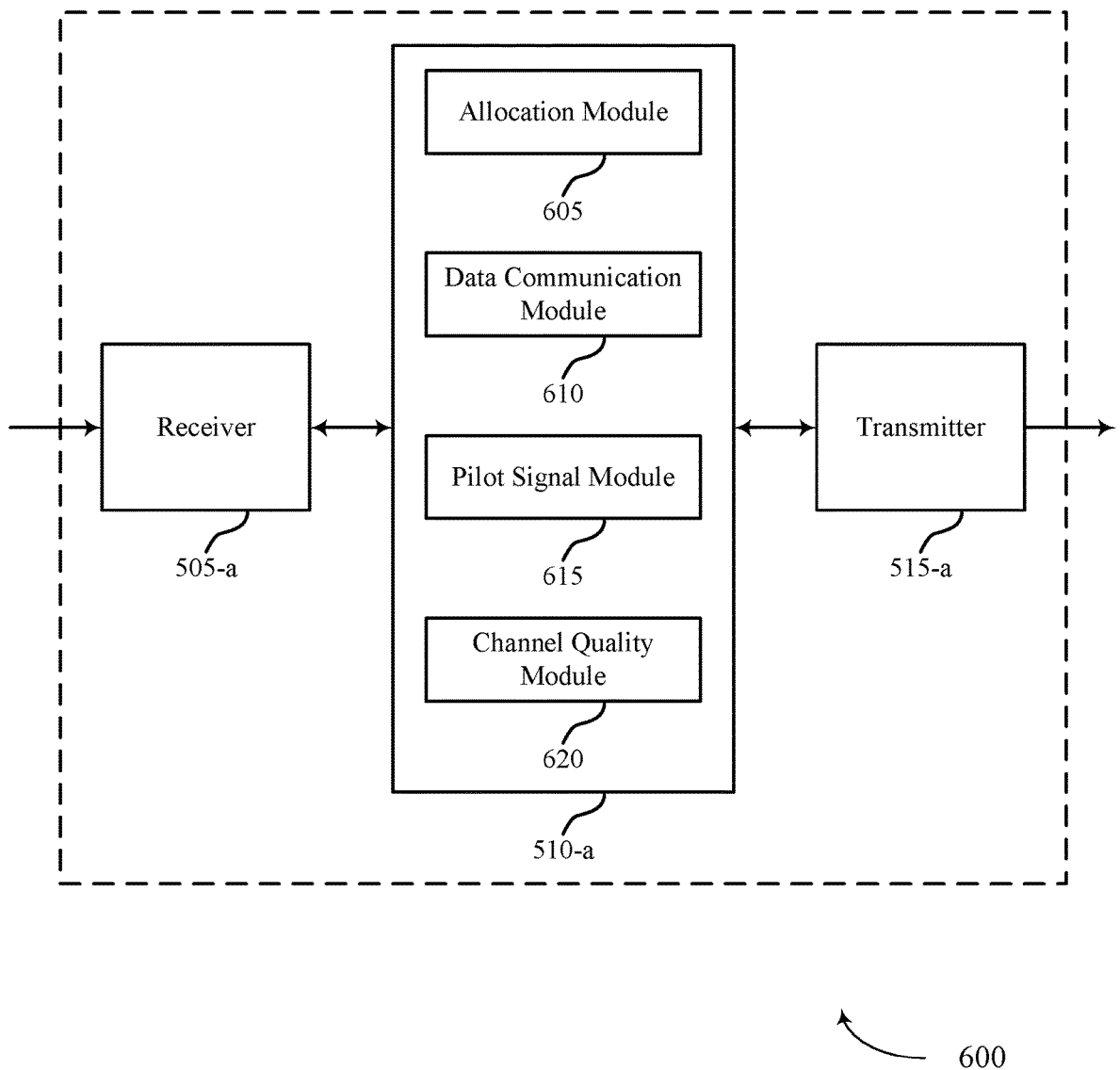

FIG. 6 shows a block diagram of a wireless device 600 for event triggered multi-link channel quality measurement and report for mission critical applications in accordance with various aspects of the present disclosure. Wireless device 600 may be an example of aspects of a wireless device 500, a base station 105, or a UE 115 described with reference to FIGS. 1-5. Wireless device 600 may include a receiver 505-*a*, a multi-link measurement module 510-*a*, or a transmitter 515-*a*. Wireless device 600 may also include a processor. Each of these components may be in communication with each other. The multi-link measurement module 510-*a* may also include an allocation module 605, a data communication module 610, a pilot signal module 615, and a channel quality module 620.

The components of wireless device 600 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 505-*a* may receive information which may be passed on to multi-link measurement module 510-*a*, and to other components of device 600. The multi-link measurement module 510-*a* may perform the operations described herein with reference to FIG. 5. The transmitter 515-*a* may transmit signals received from other components of wireless device 600.

When the device 600 is configured as a receiver, the allocation module 605 may receive a resource grant that includes an allocation of resource blocks for a downlink transmission on a plurality of component carriers as described herein with reference to FIGS. 2-4. The allocation module 605 may also receive a second resource grant that includes a reallocation of resource blocks for a retransmission of the data packet across at least a portion of the plurality of component carriers, the reallocation based at least in part on the CQI data. In some examples, the resource grant may be received on a shortened TTI. The allocation module 605 may also receive the indication with the resource grant, indicating that a receiving UE is to measure interference from neighboring base stations using the zero-power CSI-RS. The allocation module 605 may also receive the indication with the resource grant, indicating that a receiving UE is to measure instantaneous channel conditions from a serving base station using the nonzero-power CSI-RS. The allocation module 605 may also receive the indication with the resource grant, the indication triggering a receiving UE to measure pilot signals and to report instantaneous channel conditions from a serving base station and interference from neighboring base stations.

When the device 600 is configured as a transmitter, the allocation module 605 may allocate resource blocks for a transmission of a data packet and pilot signals on a plurality of component carriers as described herein with reference to FIGS. 2-4. It should be noted that the allocation module 605 may allocate the same component carrier for at least a portion of the data packet and pilot signals, different component carriers for the data packet and pilot signals, or a combination thereof. The allocation module 605 may also reallocate resource blocks for a retransmission of the data packet across at least a portion of the plurality of component carriers, the reallocating based at least in part on the received CQI data. In some examples, the resource grant may be received on a shortened TTI. The allocation module 605 may also allocate resource blocks based at least in part on a most recently received CQI data for one or more of the plurality of component carriers. The allocation module 605 may also transmit a resource grant, wherein the resource grant conveys the allocation of the resource blocks for the transmission of the data packet and pilot signals on the plurality of component carriers. The allocation module 605 may also include an indication in the resource grant that a receiving user equipment is to measure the pilot signals and report instantaneous channel conditions from a serving base station and interference from neighboring base stations. The allocation module 605 may also transmit an indication that a receiving UE is to measure interference from neighboring base stations using the zero-power CSI-RS. The allocation module 605 may also transmit an indication that a receiving UE is to measure instantaneous channel conditions from a serving base station using the nonzero-power CSI-RS.

When the device 600 is configured as a receiver, the data communication module 610 may receive a data packet across at least a portion of the plurality of component carriers as described herein with reference to FIGS. 2-4. In some examples, receiving the data packet across at least the portion of the plurality of component carriers comprises receiving the data packet across at least the portion of the plurality of component carriers in accordance to a component carrier weighting based at least in part on a most recently transmitted CQI data for one or more of the plurality of component carriers.

When the device 600 is configured as a transmitter, the data communication module 610 may also transmit the data packet across at least a portion of the plurality of component carriers as described herein with reference to FIGS. 2-4. The data communication module 610 may also retransmit the data packet and the pilot signals in response to the at least one NACK. In some examples, the data packet may be a low-latency data packet.

When the device 600 is configured as a receiver, the pilot signal module 615 may receive a pilot signal on two or more of the plurality of component carriers as described herein with reference to FIGS. 2-4.

When the device 600 is configured as a transmitter, the pilot signal module 615 may transmit the pilot signals on two or more of the plurality of component carriers as described herein with reference to FIGS. 2-4. In some examples, transmitting the pilot signals on each of the plurality of component carriers comprises transmitting the pilot signals on the two or more of the plurality of component carriers based at least in part on the time period associated with the most recently received CQI data. In some examples, transmitting the pilot signals on the two or more of the plurality of component carriers comprises transmitting at least one of a zero-power channel state information reference signal (CSI-RS) or a nonzero-power CSI-RS on the two or more of the plurality of component carriers.

When the device 600 is configured as a receiver, the channel quality module 620 may perform CQI measurements in response to an indication received with the resource grant, the CQI measurements based at least in part on the pilot signals for the two or more of the plurality of component carriers as described herein with reference to FIGS. 2-4. The channel quality module 620 may also transmit CQI data based at least in part on the CQI measurements. In some examples, transmitting CQI data comprises transmitting CQI data for each of the two or more of the plurality of component carriers on a single component carrier. The channel quality module 620 may also transmit CQI data based at least in part on CQI measurements made of the two or more of the plurality of component carriers. The channel quality module 620 may also transmit CQI data based at least in part on CQI measurements made of the two or more of the plurality of component carriers with an ACK or NACK.

When the device 600 is configured as a transmitter, the channel quality module 620 may receive CQI data on a single component carrier based at least in part on measurements of the pilot signals on the two or more of the plurality of component carriers, the measurements being triggered by the allocation of the resource blocks, as described herein with reference to FIGS. 2-4. The channel quality module 620 may also receive the CQI data with the at least one ACK or NACK.

Figure 7:
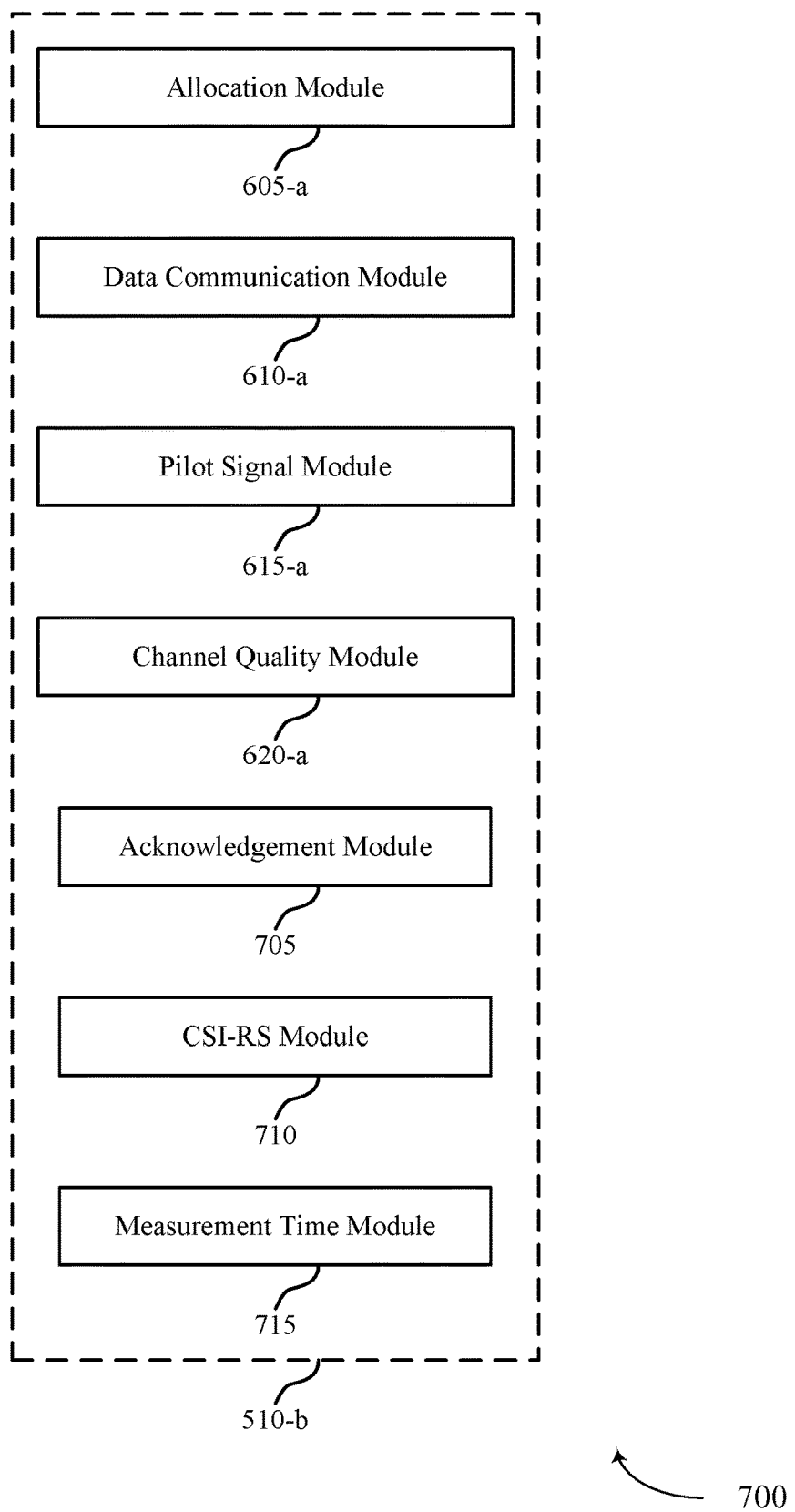

FIG. 7 shows a wireless device 700 with a multi-link measurement module 510-b which may be a component of a wireless device 500 or a wireless device 600 for event triggered multi-link channel quality measurement and report for mission critical applications in accordance with various aspects of the present disclosure. The multi-link measurement module 510-b may be an example of aspects of a multi-link measurement module 510 described with reference to FIGS. 5-6. The multi-link measurement module 510-b may include an allocation module 605-a, a data communication module 610-a, a pilot signal module 615-a, and a channel quality module 620-a. Each of these modules may perform the functions described herein with reference to FIG. 6. The multi-link measurement module 510-b may also include an acknowledgement module 705, a CSI-RS module 710, and a measurement time module 715.

The components of the multi-link measurement module 510-b may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

When the multi-link measurement module 510-b is a part of a receiver, the acknowledgement module 705 may transmit a NACK in response to the receiving of the data packet as described herein with reference to FIGS. 2-4.

When the multi-link measurement module 510-b is a part of a transmitter, the acknowledgement module 705 may receive at least one ACK or NACK in response to the transmitting of the data packet as described herein with reference to FIGS. 2-4. The acknowledgement module 705 may also receive at least one NACK in response to the transmitting of the data packet.

When the multi-link measurement module 510-b is a part of a receiver, the CSI-RS module 710 may be configured such that receiving the pilot signal on two or more of the plurality of component carriers may include receiving at least one of a zero-power channel state information reference signal (CSI-RS) or a nonzero-power CSI-RS on the two or more of the plurality of component carriers as described herein with reference to FIGS. 2-4.

When the multi-link measurement module 510-b is a part of a transmitter, the CSI-RS module 710 may be configured such that transmitting the pilot signal on two or more of the plurality of component carriers may include transmitting at least one of a zero-power channel state information reference signal (CSI-RS) or a nonzero-power CSI-RS on the two or more of the plurality of component carriers as described herein with reference to FIGS. 2-4.

When the multi-link measurement module 510-b is a part of a receiver, the measurement time module 715 may determine a time period associated with a most recently transmitted CQI data for one or more of the plurality of component carriers as described herein with reference to FIGS. 2-4. In some examples, determining the time period associated with the most recently transmitted CQI data comprises determining that the most recently transmitted CQI data has been transmitted for a duration of time in excess of a time threshold.

When the multi-link measurement module 510-b is a part of a transmitter, the measurement time module 715 may determine a time period associated with a most recently received CQI data for one or more of the plurality of component carriers as described herein with reference to FIGS. 2-4. In some examples, determining the time period associated with the most recently received CQI data comprises determining that the most recently received CQI data has been received for a duration of time in excess of a time threshold.

Figure 8:
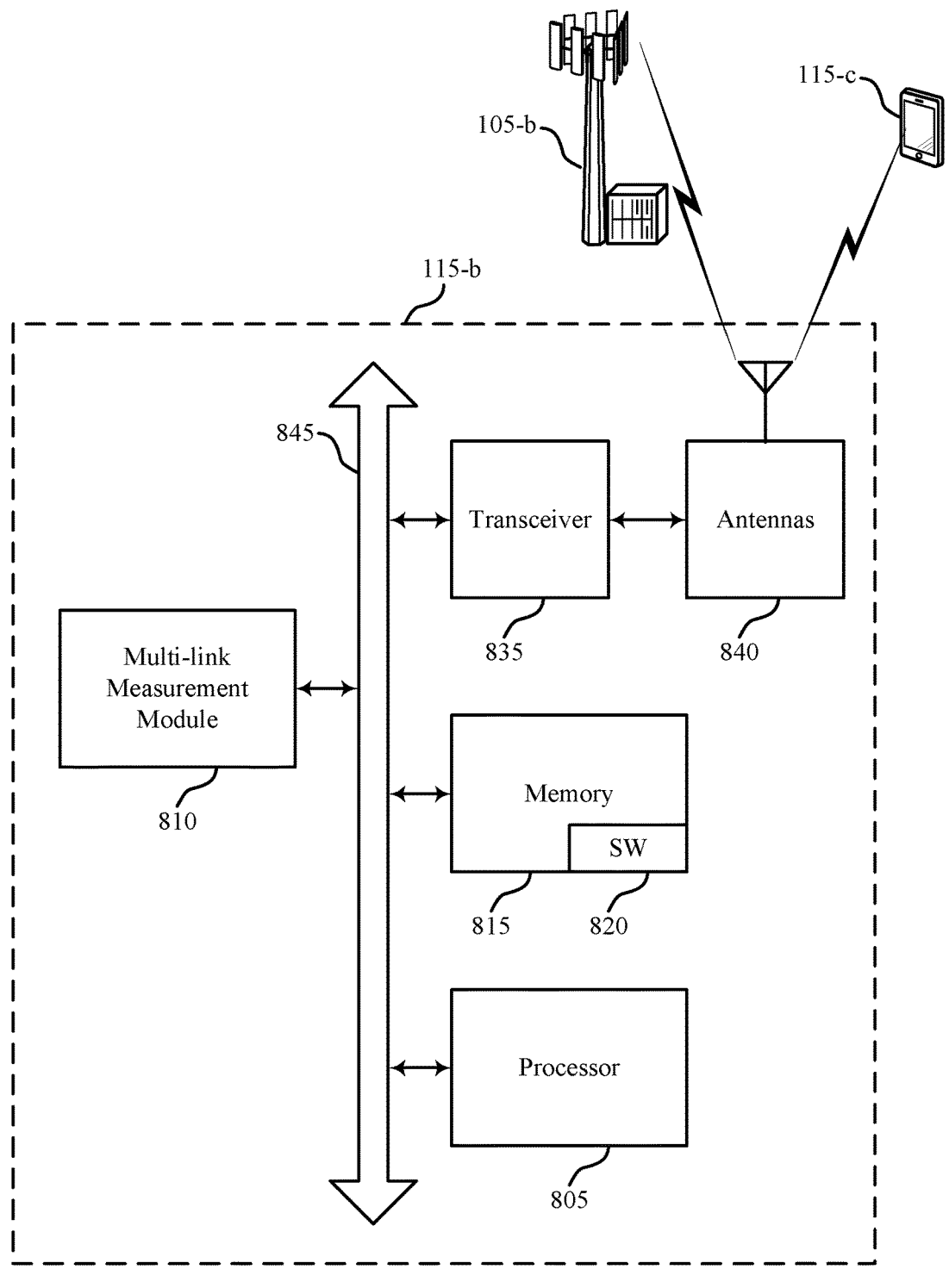
FIG. 8 illustrates a block diagram of a system including a device that supports event triggered multi-link channel quality measurement and report for mission critical applications in accordance with various aspects of the present disclosure.

FIG. 8 shows a diagram of a system 800 including a UE 115-b configured for event triggered multi-link channel quality measurement and report for mission critical applications in accordance with various aspects of the present disclosure. System 800 may include UE 115-b, which may be an example of a wireless device 500, a wireless device 600, a UE 115, a receiver 405, or a transmitter 410 described herein with reference to FIGS. 1, 2, and 4-7. The UE 115-b may include a multi-link measurement module 810, which may be an example of a multi-link measurement module 510 described with reference to FIGS. 5-7. The UE 115-b may also include a channel threshold module 825. The UE 115-b may also include components for bi-directional voice and data communications including components for transmitting communications and components for receiving communications. For example, device 801 may communicate bi-directionally with base station 105-b or UE 115-c.

The UE 115-b may also include a processor 805, and memory 815 (including software (SW)) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105-b or a UE 115-c. The transceiver 835 may include a modem to modulate the packets and provide the modulated packets to the antenna(s) 840 for transmission, and to demodulate packets received from the antenna(s) 840. While the UE 115-b may include a single antenna 840, UE 115-b may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., event triggered multi-link channel quality measurement and report for mission critical applications, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
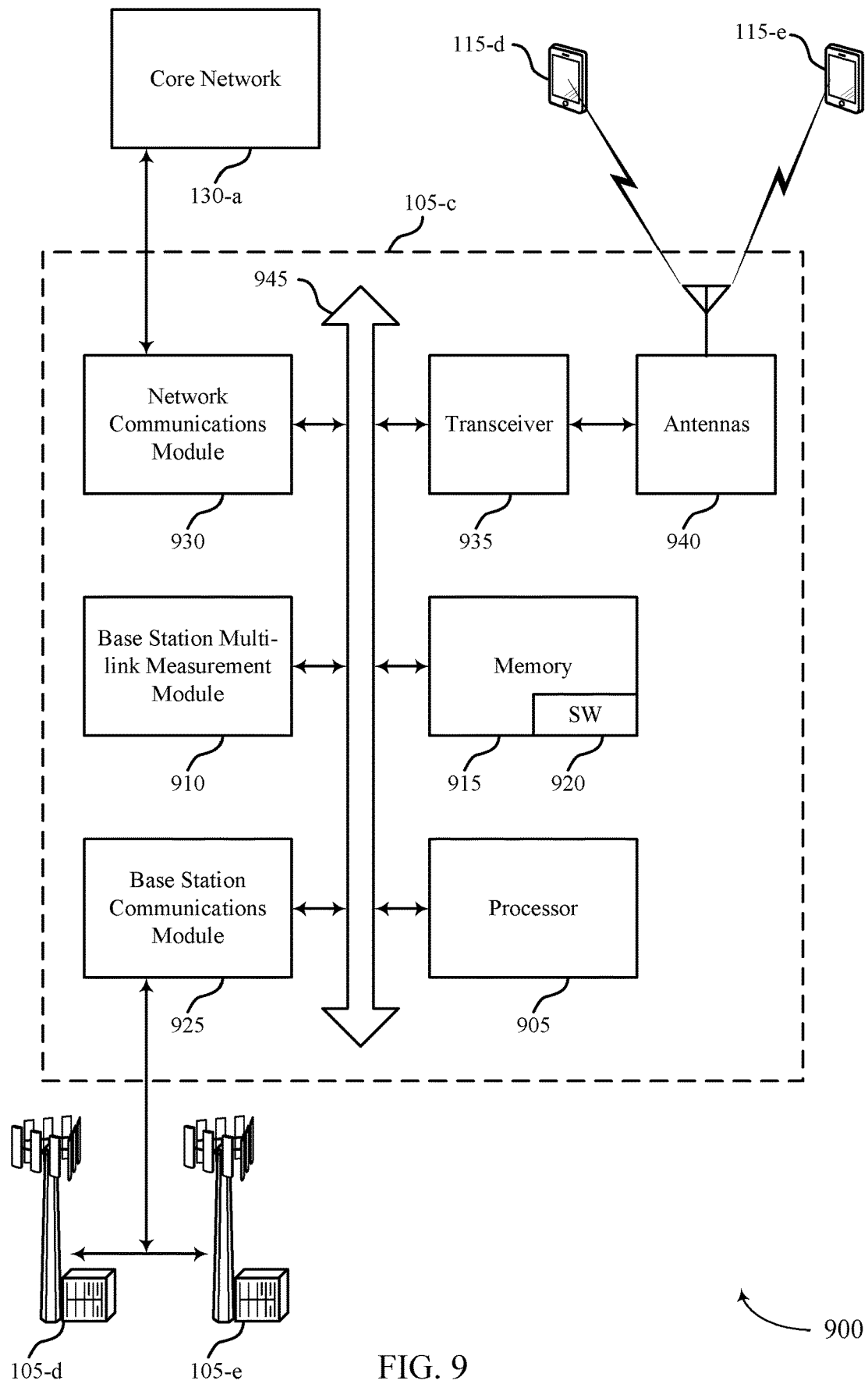
FIG. 9 illustrates a block diagram of a system including a base station that supports event triggered multi-link channel quality measurement and report for mission critical applications in accordance with various aspects of the present disclosure.

FIG. 9 shows a diagram of a system 900 including a base station 105 configured for event triggered multi-link channel quality measurement and report for mission critical applications in accordance with various aspects of the present disclosure. System 900 may include base station 105-c, which may be an example of a wireless device 600, a wireless device 700, a base station 105, a receiver 405, or a transmitter 410 described herein with reference to FIGS. 1, 2, 4, and 6-8. Base Station 105-c may include a base station multi-link measurement module 910, which may be an example of a multi-link measurement module 510 described with reference to FIGS. 5-8. Base Station 105-c may also include components for bi-directional voice and data communications including components for transmitting communications and components for receiving communications. For example, base station 105-c may communicate bi-directionally with base station 105-d or UE 115-d.

In some cases, base station 105-c may have one or more wired backhaul links. Base station 105-c may have a wired backhaul link (e.g., S1 interface, etc.) to the core network 130. Base station 105-c may also communicate with other base stations 105, such as base station 105-d and base station 105-e via inter-base station backhaul links (e.g., an X2 interface). Each of the base stations 105 may communicate with UEs 115 using the same or different wireless communications technologies. In some cases, base station 105-c may communicate with other base stations such as 105-d or 105-e utilizing base station communications module 925. In some examples, base station communications module 925 may provide an X2 interface within an LTE/LTE-A wireless communication network technology to provide communication between some of the base stations 105. In some examples, base station 105-c may communicate with other base stations through core network 130. In some cases, base station 105-c may communicate with the core network 130 through network communications module 930.

The base station 105-c may include a processor 905, memory 915 (including software (SW) 920), transceiver 935, and antenna(s) 940, which each may be in communication, directly or indirectly, with one another (e.g., over bus system 945). The transceivers 935 may be configured to communicate bi-directionally, via the antenna(s) 940, with the UEs 115, which may be multi-mode devices. The transceiver 935 (or other components of the base station 105-c) may also be configured to communicate bi-directionally, via the antennas 940, with one or more other base stations (not shown). The transceiver 935 may include a modem configured to modulate the packets and provide the modulated packets to the antennas 940 for transmission, and to demodulate packets received from the antennas 940. The base station 105-c may include multiple transceivers 935, each with one or more associated antennas 940. The transceiver may be an example of a combined receiver 505 and transmitter 515 of FIG. 5.

The memory 915 may include RAM and ROM. The memory 915 may also store computer-readable, computer-executable software 920 containing instructions that are configured to, when executed, cause the processor 905 to perform various functions described herein (e.g., event triggered multi-link channel quality measurement and report for mission critical applications, selecting coverage enhancement techniques, call processing, database management, message routing, etc.). Alternatively, the software 920 may not be directly executable by the processor 905 but be configured to cause the computer, e.g., when compiled and executed, to perform functions described herein. The processor 905 may include an intelligent hardware device, e.g., a CPU, a microcontroller, an ASIC, etc. The processor 905 may include various special purpose processors such as encoders, queue processing modules, base band processors, radio head controllers, digital signal processor (DSPs), and the like.

The base station communications module 925 may manage communications with other base stations 105. The communications management module may include a controller or scheduler for controlling communications with UEs 115 in cooperation with other base stations 105. For example, the base station communications module 925 may coordinate scheduling for transmissions to UEs 115 for various interference mitigation techniques such as beamforming or joint transmission.

Figure 10:
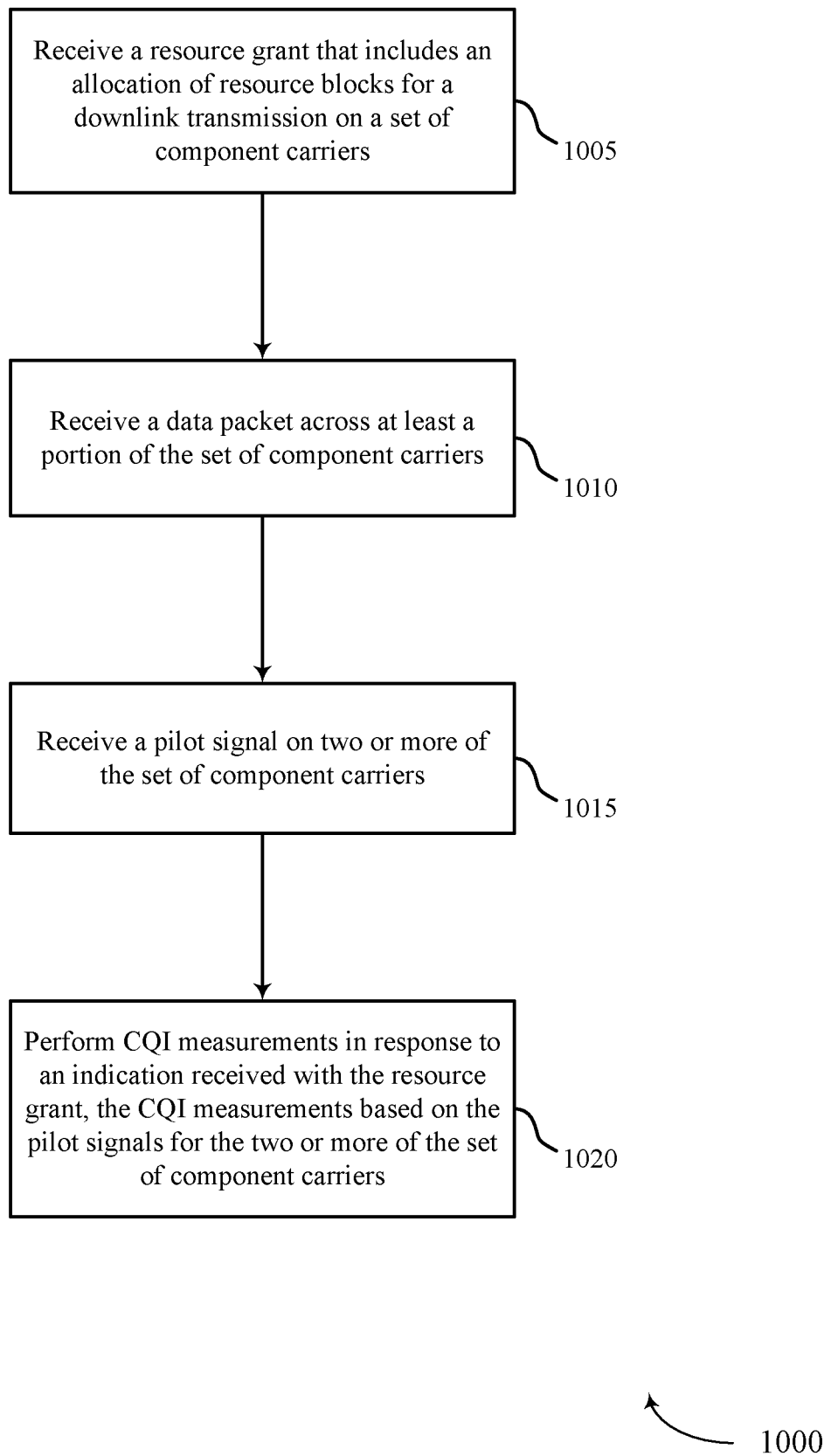
FIGS. 10-15 illustrate methods for event triggered multi-link channel quality measurement and report for mission critical applications in accordance with various aspects of the present disclosure.

FIG. 10 shows a flowchart illustrating a method 1000 for event triggered multi-link channel quality measurement and report for mission critical applications in accordance with various aspects of the present disclosure. The operations of method 1000 may be implemented by a UE 115 or receiver 405 or its components as described with reference to FIGS. 1-9. For example, the operations of method 1000 may be performed by the multi-link measurement module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1005, the UE 115 may receive a resource grant that includes an allocation of resource blocks for a downlink transmission on a plurality of component carriers as described herein with reference to FIGS. 2-4. In certain examples, the operations of block 1005 may be performed by the allocation module 605 as described herein with reference to FIG. 6.

At block 1010, the UE 115 may receive a data packet across at least a portion of the plurality of component carriers as described herein with reference to FIGS. 2-4. In certain examples, the operations of block 1010 may be performed by the data communication module 610 as described herein with reference to FIG. 6.

At block 1015, the UE 115 may receive a pilot signal on two or more of the plurality of component carriers as described herein with reference to FIGS. 2-4. In certain examples, the operations of block 1015 may be performed by the pilot signal module 615 as described herein with reference to FIG. 6.

At block 1020, the UE 115 may perform CQI measurements in response to an indication received with the resource grant, the CQI measurements based at least in part on the pilot signals for the two or more of the plurality of component carriers as described herein with reference to FIGS. 2-4. In certain examples, the operations of block 1020 may be performed by the channel quality module 620 as described herein with reference to FIG. 6.

Figure 11:
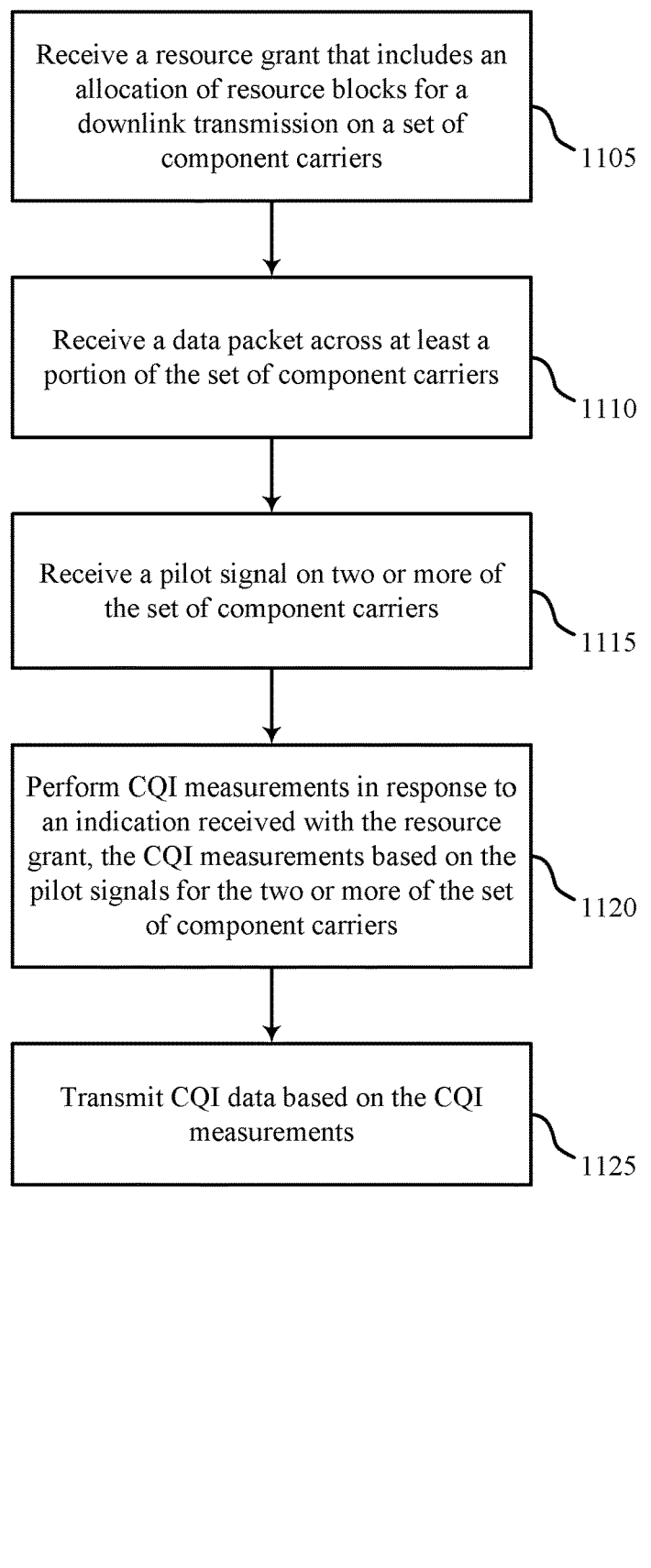

FIG. 11 shows a flowchart illustrating a method 1100 for event triggered multi-link channel quality measurement and report for mission critical applications in accordance with various aspects of the present disclosure. The operations of method 1100 may be implemented by a UE 115 or receiver 405 or its components as described with reference to FIGS. 1-9. For example, the operations of method 1100 may be performed by the multi-link measurement module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1100 may also incorporate aspects of method 1000 of FIG. 10.

At block 1105, the UE 115 may receive a resource grant that includes an allocation of resource blocks for a downlink transmission on a plurality of component carriers as described herein with reference to FIGS. 2-4. In certain examples, the operations of block 1105 may be performed by the allocation module 605 as described herein with reference to FIG. 6.

At block 1110, the UE 115 may receive a data packet across at least a portion of the plurality of component carriers as described herein with reference to FIGS. 2-4. In certain examples, the operations of block 1110 may be performed by the data communication module 610 as described herein with reference to FIG. 6.

At block 1115, the UE 115 may receive a pilot signal on two or more of the plurality of component carriers as described herein with reference to FIGS. 2-4. In certain examples, the operations of block 1115 may be performed by the pilot signal module 615 as described herein with reference to FIG. 6.

At block 1120, the UE 115 may perform CQI measurements in response to an indication received with the resource grant, the CQI measurements based at least in part on the pilot signals for the two or more of the plurality of component carriers as described herein with reference to FIGS. 2-4. In certain examples, the operations of block 1120 may be performed by the channel quality module 620 as described herein with reference to FIG. 6.

At block 1125, the UE 115 may transmit CQI data based at least in part on the CQI measurements as described herein with reference to FIGS. 2-4. In certain examples, the operations of block 1125 may be performed by the channel quality module 620 as described herein with reference to FIG. 6. In some cases, transmitting CQI data comprises: transmitting CQI data for each of the two or more of the plurality of component carriers on a single component carrier.

Figure 12:
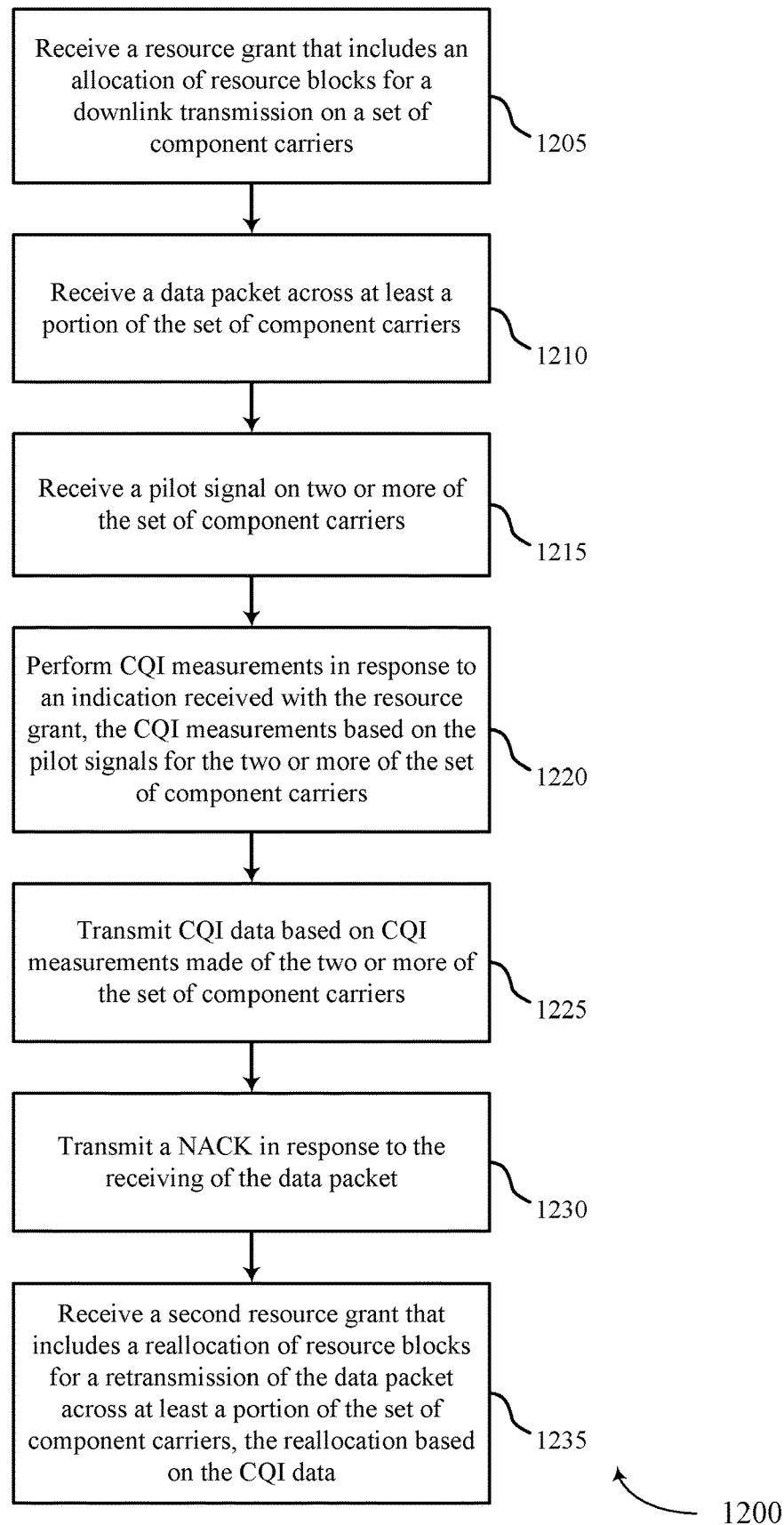

FIG. 12 shows a flowchart illustrating a method 1200 for event triggered multi-link channel quality measurement and report for mission critical applications in accordance with various aspects of the present disclosure. The operations of method 1200 may be implemented by a UE 115 or receiver 405 or its components as described with reference to FIGS. 1-9. For example, the operations of method 1200 may be performed by the multi-link measurement module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of methods 1000, and 1100 of FIGS. 10-11.

At block 1205, the UE 115 may receive a resource grant that includes an allocation of resource blocks for a downlink transmission on a plurality of component carriers as described herein with reference to FIGS. 2-4. In certain examples, the operations of block 1205 may be performed by the allocation module 605 as described herein with reference to FIG. 6.

At block 1210, the UE 115 may receive a data packet across at least a portion of the plurality of component carriers as described herein with reference to FIGS. 2-4. In certain examples, the operations of block 1210 may be performed by the data communication module 610 as described herein with reference to FIG. 6.

At block 1215, the UE 115 may receive a pilot signal on two or more of the plurality of component carriers as described herein with reference to FIGS. 2-4. In certain examples, the operations of block 1215 may be performed by the pilot signal module 615 as described herein with reference to FIG. 6.

At block 1220, the UE 115 may perform CQI measurements in response to an indication received with the resource grant, the CQI measurements based at least in part on the pilot signals for the two or more of the plurality of component carriers as described herein with reference to FIGS. 2-4. In certain examples, the operations of block 1220 may be performed by the channel quality module 620 as described herein with reference to FIG. 6.

At block 1225, the UE 115 may transmit CQI data based at least in part on CQI measurements made of the two or more of the plurality of component carriers as described herein with reference to FIGS. 2-4. In certain examples, the operations of block 1225 may be performed by the channel quality module 620 as described herein with reference to FIG. 6.

At block 1230, the UE 115 may transmit a NACK in response to the receiving of the data packet as described herein with reference to FIGS. 2-4. In certain examples, the operations of block 1230 may be performed by the acknowledgement module 705 as described herein with reference to FIG. 7.

At block 1235, the UE 115 may receive a second resource grant that includes a reallocation of resource blocks for a retransmission of the data packet across at least a portion of the plurality of component carriers, the reallocation based at least in part on the CQI data as described herein with reference to FIGS. 2-4. In certain examples, the operations of block 1235 may be performed by the allocation module 605 as described herein with reference to FIG. 6.

Figure 13:
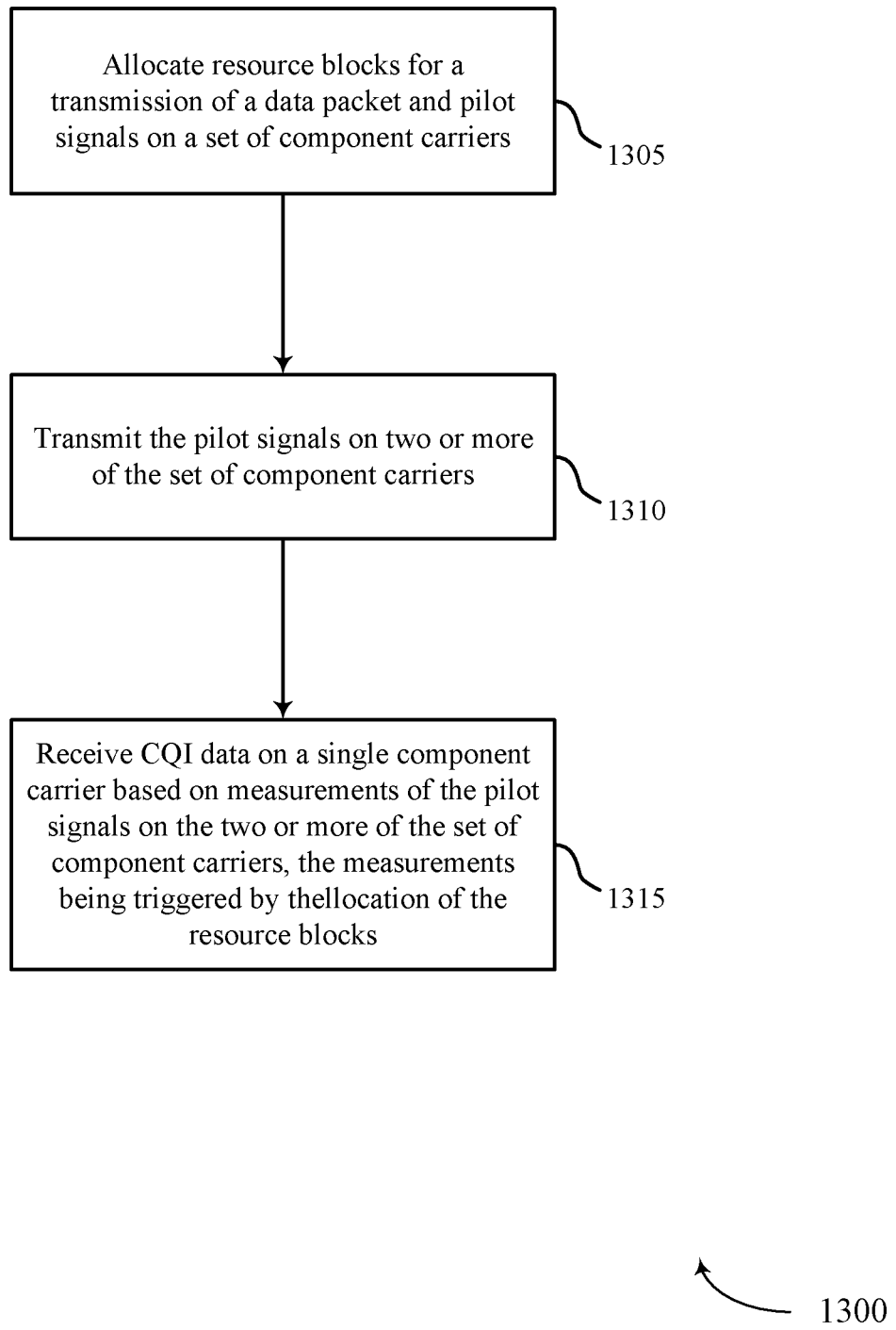

FIG. 13 shows a flowchart illustrating a method 1300 for event triggered multi-link channel quality measurement and report for mission critical applications in accordance with various aspects of the present disclosure. The operations of method 1300 may be implemented by a base station 105 or transmitter 410 or its components as described with reference to FIGS. 1-9. For example, the operations of method 1300 may be performed by the multi-link measurement module 510 as described with reference to FIGS. 5-8. In some examples, a base station 105 may execute a set of codes to control the functional elements of the base station 105 to perform the functions described below. Additionally or alternatively, the base station 105 may perform aspects the functions described below using special-purpose hardware. The method 1300 may also incorporate aspects of methods 1000, 1100, and 1200 of FIGS. 10-12.

At block 1305, the base station 105 may allocate resource blocks for a transmission of a data packet and pilot signals on a plurality of component carriers as described herein with reference to FIGS. 2-4. In certain examples, the operations of block 1305 may be performed by the allocation module 605 as described herein with reference to FIG. 6.

At block 1310, the base station 105 may transmit the pilot signals on two or more of the plurality of component carriers as described herein with reference to FIGS. 2-4. In certain examples, the operations of block 1310 may be performed by the pilot signal module 615 as described herein with reference to FIG. 6.

At block 1315, the base station 105 may receive CQI data on a single component carrier based at least in part on measurements of the pilot signals on the two or more of the plurality of component carriers, the measurements being triggered by the allocation of the resource blocks as described herein with reference to FIGS. 2-4. In certain examples, the operations of block 1315 may be performed by the channel quality module 620 as described herein with reference to FIG. 6.

Figure 14:
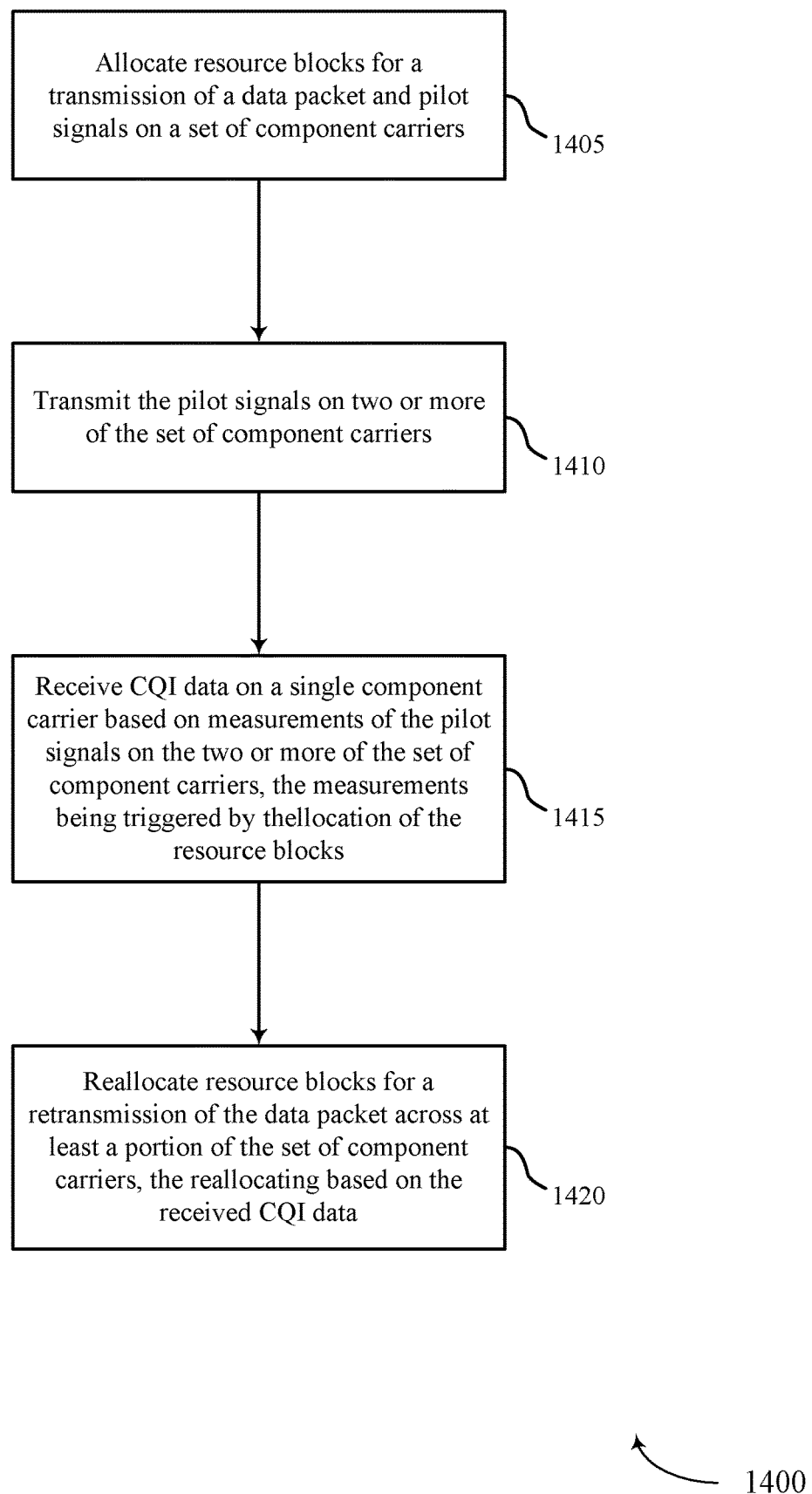

FIG. 14 shows a flowchart illustrating a method 1400 for event triggered multi-link channel quality measurement and report for mission critical applications in accordance with various aspects of the present disclosure. The operations of method 1400 may be implemented by a base station 105 or transmitter 410 or its components as described with reference to FIGS. 1-9. For example, the operations of method 1400 may be performed by the multi-link measurement module 510 as described with reference to FIGS. 5-8. In some examples, a base station 105 may execute a set of codes to control the functional elements of the base station 105 to perform the functions described below. Additionally or alternatively, the base station 105 may perform aspects the functions described below using special-purpose hardware. The method 1400 may also incorporate aspects of methods 1000, 1100, 1200, and 1300 of FIGS. 10-13.

At block 1405, the base station 105 may allocate resource blocks for a transmission of a data packet and pilot signals on a plurality of component carriers as described herein with reference to FIGS. 2-4. In certain examples, the operations of block 1405 may be performed by the allocation module 605 as described herein with reference to FIG. 6.

At block 1410, the base station 105 may transmit the pilot signals on two or more of the plurality of component carriers as described herein with reference to FIGS. 2-4. In certain examples, the operations of block 1410 may be performed by the pilot signal module 615 as described herein with reference to FIG. 6.

At block 1415, the base station 105 may receive CQI data on a single component carrier based at least in part on measurements of the pilot signals on the two or more of the plurality of component carriers, the measurements being triggered by the allocation of the resource blocks as described herein with reference to FIGS. 2-4. In certain examples, the operations of block 1415 may be performed by the channel quality module 620 as described herein with reference to FIG. 6.

At block 1420, the base station 105 may reallocate resource blocks for a retransmission of the data packet across at least a portion of the plurality of component carriers, the reallocating based at least in part on the received CQI data as described herein with reference to FIGS. 2-4. In certain examples, the operations of block 1420 may be performed by the allocation module 605 as described herein with reference to FIG. 6.

Figure 15:
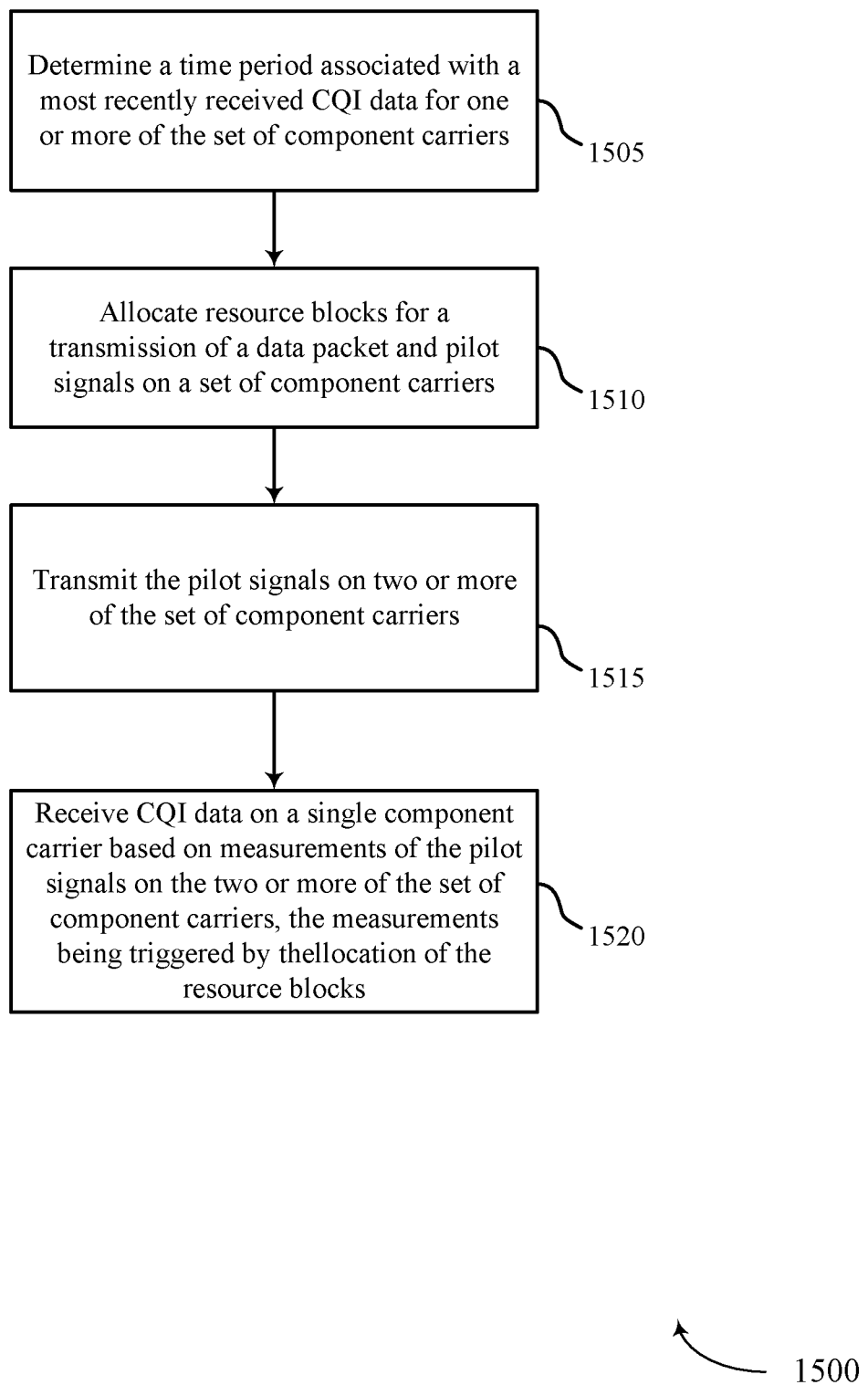

FIG. 15 shows a flowchart illustrating a method 1500 for event triggered multi-link channel quality measurement and report for mission critical applications in accordance with various aspects of the present disclosure. The operations of method 1500 may be implemented by a base station 105 or transmitter 410 or its components as described with reference to FIGS. 1-9. For example, the operations of method 1500 may be performed by the multi-link measurement module 510 as described with reference to FIGS. 5-8. In some examples, a base station 105 may execute a set of codes to control the functional elements of the base station 105 to perform the functions described below. Additionally or alternatively, the base station 105 may perform aspects the functions described below using special-purpose hardware. The method 1500 may also incorporate aspects of methods 1000, 1100, 1200, 1300, and 1400 of FIGS. 10-14.

At block 1505, the base station 105 may determine a time period associated with a most recently received CQI data for one or more of the plurality of component carriers as described herein with reference to FIGS. 2-4. In certain examples, the operations of block 1520 may be performed by the measurement time module 715 as described herein with reference to FIG. 7. In some cases, determining the time period associated with the most recently received CQI data comprises: determining that the most recently received CQI data has been received for a duration of time in excess of a time threshold.

At block 1510, the base station 105 may allocate resource blocks for a transmission of a data packet and pilot signals on a plurality of component carriers as described herein with reference to FIGS. 2-4. In certain examples, the operations of block 1505 may be performed by the allocation module 605 as described herein with reference to FIG. 6.

At block 1515, the base station 105 may transmit the pilot signals on two or more of the plurality of component carriers as described herein with reference to FIGS. 2-4. In certain examples, the operations of block 1510 may be performed by the pilot signal module 615 as described herein with reference to FIG. 6. In some cases, transmitting the pilot signals on each of the plurality of component carriers includes transmitting the pilot signals on the two or more of the plurality of component carriers based at least in part on the time period associated with the most recently received CQI data.

At block 1520, the base station 105 may receive CQI data on a single component carrier based at least in part on measurements of the pilot signals on the two or more of the plurality of component carriers, the measurements being triggered by the allocation of the resource blocks as described herein with reference to FIGS. 2-4. In certain examples, the operations of block 1515 may be performed by the channel quality module 620 as described herein with reference to FIG. 6.

Thus, methods 1000, 1100, 1200, 1300, 1400, and 1500 may provide for event triggered multi-link channel quality measurement and report for mission critical applications. It should be noted that methods 1000, 1100, 1200, 1300, 1400, and 1500 describe possible implementation, and that the operations and the steps may be rearranged or otherwise modified such that other implementations are possible. In some examples, aspects from two or more of the methods 1000, 1100, 1200, 1300, 1400, and 1500 may be combined.

The detailed description set forth above in connection with the appended drawings describes exemplary configurations and does not represent all the examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:
1. A method of wireless communication, comprising:
   receiving a first resource grant that includes an allocation of resource blocks for a downlink transmission via a plurality of component carriers;
   receiving, based at least in part on the allocation, a data packet distributed across a first carrier and a second carrier of the plurality of component carriers according to a first distribution;
   receiving a pilot signal via each of the first carrier and the second carrier;
   performing channel quality indicator (CQI) measurements in response to an indication received with the first resource grant, the CQI measurements based at least in part on the pilot signals received via each of the first carrier and the second carrier;
   receiving a second resource grant that includes a reallocation of resource blocks across both the first carrier and the second carrier for a retransmission of the data packet, wherein the reallocation is based at least in part on the CQI measurements, wherein the reallocation allocates a first quantity of resource blocks of the data packet to the first carrier and a second quantity of resource blocks of the data packet which is less than the first quantity to the second carrier based at least in part on a first channel quality associated with the first carrier being greater than a second channel quality associated with the second carrier; and
   receiving, based at least in part on the reallocation, the data packet distributed across the first carrier and the second carrier according to a second distribution which is different from the first distribution.

2. The method of claim 1, further comprising:
transmitting CQI data based at least in part on the CQI measurements.

3. The method of claim 2, wherein transmitting CQI data comprises:
transmitting CQI data for the first carrier and the second carrier via a single component carrier.

4. The method of claim 1, further comprising:
transmitting second CQI data associated with the second carrier at a second time;
transmitting first CQI data associated with the first carrier at a first time subsequent to the second time; and
receiving a first part of the data packet comprising the first quantity of resource blocks within the first carrier and receiving a second part of the data packet comprising the second quantity of resource blocks which is less than the first quantity within the first carrier based at least in part on transmitting the first CQI data subsequent to the second CQI data.

5. The method of claim 1, further comprising:
transmitting CQI data based at least in part on the CQI measurements;
transmitting a negative acknowledgement (NACK) in response to the receiving of the data packet; and
wherein the receiving the second resource grant is based at least in part on the CQI data.

6. The method of claim 1, further comprising:
transmitting CQI data based at least in part on the CQI measurements with an acknowledgement (ACK) or negative acknowledgment (NACK).

7. The method of claim 1, wherein the first resource grant is received within a shortened transmission time interval (TTI).

8. The method of claim 1, wherein receiving the pilot signal via each of the first carrier and the second carrier comprises:
receiving at least one of a zero-power channel state information reference signal (CSI-RS) or a nonzero-power CSI-RS via the first carrier and the second carrier.

9. The method of claim 8, further comprising:
receiving the indication with the first resource grant, wherein the indication indicates that a receiving user equipment (UE) is to measure interference from neighboring base stations using the zero-power CSI-RS or that a receiving UE is to measure instantaneous channel conditions from a serving base station using the non-zero-power CSI-RS.

10. The method of claim 1, further comprising:
receiving the indication with the first resource grant, the indication triggering a receiving UE to measure pilot signals and to report instantaneous channel conditions from a serving base station and interference from neighboring base stations.

11. A method of wireless communication, comprising:
allocating resource blocks for a transmission of a data packet distributed across a first carrier and a second carrier of a plurality of component carriers according to a first distribution;
transmitting pilot signals via the first carrier and the second carrier;
receiving channel quality indicator (CQI) data via a single component carrier based at least in part on measurements of the pilot signals transmitted via the first carrier and the second carrier, the measurements being triggered by the allocation of the resource blocks; and
reallocating, based at least in part on the received CQI data, resource blocks for a retransmission of the data packet distributed across the first carrier and the second carrier according to a second distribution which is different from the first distribution, wherein the second distribution allocates a first quantity of resource blocks of the data packet to the first carrier and a second quantity of resource blocks of the data packet which is less than the first quantity to the second carrier based at least in part on a first channel quality associated with the first carrier being greater than a second channel quality associated with the second carrier.

12. The method of claim 11, further comprising:
transmitting a first part of the data packet using at least a portion of the first carrier and a second part of the data packet using at least a portion of the second carrier based at least in part on the second distribution.

13. The method of claim 11, wherein the reallocating is based at least in part on the received CQI data.

14. The method of claim 11, wherein allocating resource blocks for the transmission of the data packet comprises:
allocating resource blocks based at least in part on a most recently received CQI data for one or more of the first carrier or the second carrier.

15. The method of claim 11, further comprising:
determining a time period associated with a most recently received CQI data for one or more of the first carrier or the second carrier; and
wherein transmitting the pilot signals via each of the first carrier and the second carrier comprises:
transmitting the pilot signals via the first carrier and the second carrier based at least in part on the time period associated with the most recently received CQI data.

16. The method of claim 15, wherein determining the time period associated with the most recently received CQI data comprises:
determining that the most recently received CQI data has been received for a duration of time in excess of a time threshold.

17. The method of claim 11, further comprising:
transmitting a resource grant, wherein the resource grant conveys the first distribution of the resource blocks for the transmission of the data packet.

18. The method of claim 17, further comprising:
including an indication in the resource grant that a receiving UE is to measure the pilot signals and report instantaneous channel conditions from a serving base station and interference from neighboring base stations.

19. The method of claim 17, wherein the resource grant is transmitted within a shortened transmission time interval (TTI).

20. The method of claim 11, further comprising:
receiving at least one acknowledgment (ACK) or negative acknowledgment (NACK) in response to the transmitting of the data packet.

21. The method of claim 20, further comprising:
receiving the CQI data with the at least one ACK or NACK.

22. The method of claim 11, further comprising:
receiving at least one negative acknowledgment (NACK) in response to the transmitting of the data packet; and
retransmitting the data packet and the pilot signals in response to the at least one NACK.

23. The method of claim 11, wherein transmitting the pilot signals via the first carrier and the second carrier comprises:

transmitting at least one of a zero-power channel state information reference signal (CSI-RS) or a nonzero-power CSI-RS via the the first carrier and the second carrier.

24. The method of claim 23, further comprising:
transmitting an indication that a receiving UE is to measure interference from neighboring base stations using the zero-power CSI-RS or that the receiving UE is to measure instantaneous channel conditions from a serving base station using the nonzero-power CSI-RS.

25. The method of claim 11, wherein the data packet is a low-latency data packet.

26. An apparatus for wireless communication, comprising:
a processor;
memory coupled with the processor; and
instructions stored in the memory and operable, when executed by the processor, to cause the apparatus to:
receive a first resource grant that includes an allocation of resource blocks for a downlink transmission via a plurality of component carriers;
receive, based at least in part on the allocation, a data packet distributed across a first carrier and a second carrier of the plurality of component carriers according to a first distribution;
receive a pilot signal via each of two or more of the first carrier and the second carrier;
perform channel quality indicator (CQI) measurements in response to an indication received with the first resource grant, the CQI measurements based at least in part on the pilot signals received via each of the first carrier and the second carrier;
receive a second resource grant that includes a reallocation of resource blocks across both the first carrier and the second carrier for a retransmission of the data packet, wherein the reallocation is based at least in part on the CQI measurements; and
receive, based at least in part on the reallocation, the data packet distributed across the first carrier and the second carrier according to a second distribution which is different from the first distribution, wherein the second distribution allocates a first quantity of resource blocks of the data packet to the first carrier and a second quantity of resource blocks of the data packet which is less than the first quantity to the second carrier based at least in part on a first channel quality associated with the first carrier being greater than a second channel quality associated with the second carrier.

27. The apparatus of claim 26, wherein the instructions are operable to cause the apparatus to:
transmit CQI data based at least in part on the CQI measurements.

28. The apparatus of claim 26, wherein the instructions are operable to cause the apparatus to:
transmit CQI data based at least in part on CQI measurements made of the first carrier and the second carrier;
transmit a negative acknowledgement (NACK) in response to the receiving of the data packet; and
wherein the reallocation of resource blocks for the retransmission of the data packet distributed across the first carrier and the second carrier is based at least in part on the CQI data.

29. An apparatus for wireless communication, comprising:
a processor;
memory coupled with the processor; and
instructions stored in the memory and operable, when executed by the processor, to cause the apparatus to:
allocate resource blocks for a transmission of a data packet distributed across a first carrier and a second carrier of a plurality of component carriers according to a first distribution;
transmit pilot signals via the first carrier and the second carrier;
receive channel quality indicator (CQI) data via a single component carrier based at least in part on measurements of the pilot signals transmitted via the first carrier and the second carrier, the measurements being triggered by the allocation of the resource blocks; and
reallocate, based at least in part on the received CQI data, resource blocks for a retransmission of the data packet distributed across the first carrier and the second carrier according to a second distribution which is different from the first distribution, wherein the second distribution allocates a first quantity of resource blocks of the data packet to the first carrier and a second quantity of resource blocks of the data packet which is less than the first quantity to the second carrier based at least in part on a first channel quality associated with the first carrier being greater than a second channel quality associated with the second carrier.

30. The apparatus of claim 29, wherein the instructions are operable to cause the apparatus to:
transmit a first part of the data packet using at least a portion of the first carrier and a second part of the data packet using at least a portion of the second carrier based at least in part on the second distribution.

* * * * *